United States Patent
Liu et al.

(10) Patent No.: US 11,057,797 B2
(45) Date of Patent: Jul. 6, 2021

(54) METHOD AND DEVICE FOR PROCESSING INFORMATION

(71) Applicant: CHINA ACADEMY OF TELECOMMUNICATIONS TECHNOLOGY, Beijing (CN)

(72) Inventors: Jiamin Liu, Beijing (CN); Fangli Xu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/475,950

(22) PCT Filed: Feb. 12, 2018

(86) PCT No.: PCT/CN2018/076476
§ 371 (c)(1),
(2) Date: Jul. 3, 2019

(87) PCT Pub. No.: WO2018/127238
PCT Pub. Date: Jul. 12, 2018

(65) Prior Publication Data
US 2019/0335364 A1 Oct. 31, 2019

(30) Foreign Application Priority Data
Jan. 5, 2017 (CN) .......................... 201710008344.0

(51) Int. Cl.
*H04W 36/00* (2009.01)
(52) U.S. Cl.
CPC ... *H04W 36/0016* (2013.01); *H04W 36/0055* (2013.01); *H04W 36/0038* (2013.01)

(58) Field of Classification Search
CPC ......... H04W 36/0016; H04W 36/0055; H04W 36/0038; H04W 36/0077; H04W 36/0011; H04W 36/08
(Continued)

(56) References Cited

U.S. PATENT DOCUMENTS

| 2003/0176187 A1* | 9/2003 | Menzel ................. H04W 36/18 455/432.1 |
| 2008/0019320 A1* | 1/2008 | Phan ..................... H04W 36/02 370/331 |

(Continued)

FOREIGN PATENT DOCUMENTS

| CN | 101247643 A | 8/2008 |
| CN | 102017704 A | 4/2011 |

(Continued)

OTHER PUBLICATIONS

International Search Report in the international application No. PCT/CN2018/076476 dated May 4, 2018.
(Continued)

*Primary Examiner* — Farid Seyedvosoghi
(74) *Attorney, Agent, or Firm* — Ladas & Parry, LLP

(57) ABSTRACT

A method for processing information and a device for processing information are provided. The method for processing information is applied to a first node. The method includes: receiving, by the first node, an indication message from a network side, wherein the indication message indicates a user equipment under the first node to hand over to a second node; and negotiating, by the first node, with the second node to reserve radio link layer control protocol (RLC) status information and cached data of all bearers of the user equipment, so that the second node provides a continuing data service to the user equipment based on the reserved information.

20 Claims, 4 Drawing Sheets

--- a first node receives an indication message from a network side, and the indication message indicates a user equipment under the first node to hand over to a second node — 101 the first node negotiates with the second node to reserve radio link layer control protocol (RLC) status information and cached data of all bearers of the user equipment so that the second node provides a continuing data service to the user equipment based on the reserved information — 102

(58) Field of Classification Search
USPC .......................................................... 455/436
See application file for complete search history.

(56) References Cited

U.S. PATENT DOCUMENTS

| | | | |
|---|---|---|---|
| 2008/0095116 A1* | 4/2008 | Kim | H04L 1/1841 370/331 |
| 2008/0119189 A1 | 5/2008 | Chang et al. | |
| 2009/0034476 A1* | 2/2009 | Wang | H04W 36/0011 370/331 |
| 2009/0286541 A1* | 11/2009 | Maheshwari | H04W 76/10 455/436 |
| 2010/0195617 A1* | 8/2010 | Park | H04W 36/02 370/331 |
| 2012/0026980 A1* | 2/2012 | Gao | H04W 36/0077 370/331 |
| 2012/0147869 A1 | 7/2012 | Chhatriwala et al. | |
| 2015/0244429 A1* | 8/2015 | Zhang | H04B 7/024 370/329 |
| 2017/0289879 A1 | 10/2017 | Wang et al. | |

FOREIGN PATENT DOCUMENTS

| | | |
|---|---|---|
| CN | 103329473 A | 9/2013 |
| CN | 104301955 A | 1/2015 |
| WO | 2016021820 A1 | 2/2016 |

OTHER PUBLICATIONS

First Office Action in Chinese Application No. 201710008344.0 dated Dec. 29, 2018.
International Preliminary Report on Patentability in the international Application No. PCT/CN2018/076476, dated Jul. 9, 2019 with English translation provided by WIPO.

* cited by examiner

METHOD AND DEVICE FOR PROCESSING INFORMATION

CROSS-REFERENCE TO RELATED APPLICATIONS

The present application is the U.S. national phase of PCT Application No. PCT/CN2018/076476 filed on Feb. 12, 2018, which claims a priority to Chinese Patent Application No. 201710008344.0 filed in China on Jan. 5, 2017, the entire disclosures of which are incorporated herein by reference.

TECHNICAL FIELD

The present disclosure relates to the technical field of communications, and in particular to a method for processing information and a device for processing information.

BACKGROUND

In the future development of mobile communication systems, in order to better meet user requirements and greatly improve the capacity and throughput of networks, more transmission nodes will be necessarily introduced. That is, networks in the future are ultra-dense networks. In the Long Term Evolution (LTE) system, network-side nodes are mostly connected in a wired manner. As shown in FIG. 1, evolved NodeBs (eNBs) are connected via wired links, and the eNBs and core network nodes are also connected via wired links. The core network nodes include a Mobility Management Entity (MME), a Serving GateWay (S-GW), and the like.

In the existing R8 specification, the typical internal handover processes of the MME and S-GW are as follows.

A source eNB determines that a User Equipment (UE, also referred to as "terminal") needs to handover, based on a measurement report and Radio Resource Management (RRM) information.

The source eNB initiates a handover request message to a target eNB, and the message carries necessary information for a handover to a target side.

The target eNB performs admission control based on a received Evolved Radio Access Bearer (E-RAB) and Quality of Service (QoS) information, configures the requested resource and reserves a Cell Radio Network Temporary Identifier (C-RNTI) and a possible Random Access Channel (RACH) Preamble (preamble of an access channel).

The target eNB prepares for the handover and sends a handover request acknowledgement message to the source eNB. The handover request acknowledgement message includes a Radio Resource Control (RRC) message sent to the UE for performing the handover. The RRC message includes a new C-RNTI, and a target eNB security algorithm indication, and may include a dedicated RACH Preamble and other parameters such as access parameters and system information blocks (SIBs). If necessary, the handover request acknowledgement message may further include information on a data forwarding channel.

Once the handover request acknowledgement message is received by the source eNB or a handover command is started to be transmitted on the downlink, a data forwarding process is initiated.

The source eNB performs operations, such as integrity protection and encryption, on the RRC connection reconfiguration message passed through the target eNB, and then sends the processed message to the UE.

The source eNB sends a Sequence Number (SN) status delivery message to the target eNB. The message carries uplink Packet Data Convergence Protocol (PDCP) SN reception status information and downlink PDCP SN transmission status information of E-RABs (RLC AM service) for which the PDCP statuses need to be reserved. The uplink PDCP SN reception status at least includes bit map information of the PDCP SN of the first Service Data Unit (SDU) that has lost Unordered List (UL) and possible out-of-order UL PDCP SNs. The downlink PDCP SN transmission status includes a next PDCP SN number allocated by the target eNB to the new SDU.

After receiving RRC connection reconfiguration signaling containing the handover information, the UE synchronizes with the target eNB and sends an RRC connection reconfiguration completion message.

In order to achieve a data-lossless handover, data forwarding is required on the user plane. A process of the data forwarding is as follows.

In a handover preparation phase, a user plane tunnel for data forwarding is established between the source eNB and the target eNB. A tunnel is established for each E-RAB that needs data forwarding, for uplink data forwarding and for downlink data forwarding for another user. In a handover performing phase, user data is forwarded from the source eNB to the target eNB. In a handover completion phase, the source eNB continues forwarding user plane data until the last packet "end marker" is forwarded. It is determined that the data forwarding is completed once the target eNB receives the "end marker".

In systems of related art, the RLC layer and all the layers below the RLC layer are reset during the handover. Only in the PDCP layer, due to the requirements of lossless service, some unsent or unacknowledged data is delivered, and SN information of the PDCP is delivered to the target node. In this way, it is ensured that the target node can losslessly continue the processing of data.

In an ultra-dense network, transmission nodes are close to each other. Therefore, users frequently hand over and move between the transmission modes. In this case, if the status of layer 2 (L2, i.e., the medium access control layer) needs to be reset every time a service node is changed, the user experience is affected, and the system efficiency may also be reduced due to unnecessary retransmission caused by the reset. This is because some of transmission information of the RLC layer may be lost due to the reset of the RLC layer. For example, certain RLC protocol data units (PDUs) are successfully transmitted and a positive acknowledgment is received from a receiving end, and the RLC PDU contains a certain segment of high-level data instead of the entire high-level data, but the segment of information which is successfully transmitted will not be reserved. It is equivalent to that the entire high-level data, including the segment which has been successfully transmitted, needs to be retransmitted at the target node, thereby resulting in redundant retransmissions and being adverse to the system efficiency and user experience.

SUMMARY

To solve the technical problem, a method for processing information and a device for processing information are provided according to the present disclosure, which can ensure that a user equipment (UE) moves quickly and efficiently between nodes. Therefore, user experience of a handover between nodes is improved and data transmission efficiency of the network is improved.

In order to solve the above technical problem, technical solutions according to embodiments of the present disclosure are as follows.

In an aspect, a method for processing information applied to a first node is provided. The method includes:
receiving, by the first node, an indication message from a network side, where the indication message indicates a user equipment under the first node to hand over to a second node; and
negotiating, by the first node, with the second node to reserve radio link layer control protocol (RLC) status information and cached data of all bearers of the user equipment, so that the second node provides a continuing data service to the user equipment based on the reserved information.

Further, the first node is a first secondary node, the second node is a second secondary node, the first secondary node and the second secondary node share a same master control node, a Packet Data Convergence Protocol (PDCP) protocol stack is located at the master control node, and an RLC protocol stack and other protocol stacks below the RLC protocol stack are respectively located at the first secondary node and the second secondary node;
the receiving, by the first node, an indication message from a network side includes:
receiving, by the first secondary node, an indication message sent by the master control node; and
the negotiating, by the first node, with the second node to reserve RLC status information and cached data of all the bearers of the user equipment includes:
forwarding, by the first secondary node, the RLC status information and the cached data of all the bearers of the user equipment, to the second secondary node.

Further, after the indication message sent by the master control node is received by the first secondary node, the method further includes:
immediately triggering and forming, by the first secondary node, a new status report in response to a current receiving status, and sending the new status report to the user equipment, where the status report includes a maximum value (ACK_SN) of SNs of data packets that have been correctly received in the uplink, and the status report also includes SNs or segmentation information of all the data packets within the ACK_SN that have not been successfully received.

Further, in a case that a direct interface exists between the first secondary node and the second secondary node,
the first secondary node forwards the RLC status information and the cached data of all the bearers of the user equipment to the second secondary node via the direct interface; and
in a case that no direct interface exists between the first secondary node and the second secondary node, the first secondary node forwards the RLC status information and the cached data of all the bearers of the user equipment to the second secondary node via the master control node.

Further, the RLC status information includes acknowledged mode (AM) status information;
for an AM sending end, the AM status information includes one or more types of the following information: a sequence number (SN) of a next to-be-sent data packet, an SN of a next acknowledged successfully-sent data packet, and configuration information of a Poll, and the configuration information of the Poll includes one or more types of the following information: triggering the Poll every other preset quantity of SNs or every other preset quantity of bytes, the accumulative total quantity of SNs or the accumulative total quantity of bytes from the last Poll triggering to a current time instant, and a maximum SN number recorded during the last Poll triggering; and
for an AM receiving end, the AM status information includes one or more types of the following information: a maximum value of SNs of data packets correctly and completely received in sequence or the maximum value plus one, a maximum value of SNs of within-receiving-window data packets as received or the maximum value plus one, and a maximum value of SNs capable of being included in the status report or the maximum value plus one; or
for an AM sending end, the AM status information includes: an SN of a first data packet that has been sent with no ARQ ACK acknowledgement being received from a peer end, and a corresponding bit stream, where the bit stream indicates whether each data packet sent after the first data packet receives an ARQ ACK acknowledgement; and
for an AM receiving end, the AM status information includes: an SN of a first unreceived data packet and a corresponding bit stream, where the bit stream indicates a receiving situation of each data packet after the first unreceived data packet.

Further, the cached data includes cached data to be forwarded in the AM mode;
for an AM sending end, the cached data to be forwarded in the AM mode includes: all data packets that have been sent with no ARQ ACK being received or all data packets after a first data packet that has been sent with no ARQ ACK being received, and all data packets that are not sent and are cached in a sending cache; and
for an AM receiving end, the cached data to be forwarded in the AM mode includes: all data packets in the receiving cache.

Further, for the AM sending end, the cached data to be forwarded in the AM mode further includes the quantity of times that all data packets having been sent are sent; and
for the AM receiving end, in a case that data in the receiving cache is a portion of a data packet, the cached data to be forwarded in the AM mode further includes segmentation information of the portion of the data packet.

Further, the segmentation information is in a form of SO+LI, SO indicates a starting position of the portion in the data packet, and LI indicates length information of the portion; and
the segmentation information also includes information indicating whether the portion is a last segment of the data packet.

Further, the RLC status information includes unacknowledged mode (UM) status information;
for a UM sending end, the UM status information includes an SN of a data packet to be sent next; and
for a UM receiving end, the UM status information includes a maximum value of SNs of received data packets or the maximum value minus one.

Further, the cached data includes cached data to be forwarded in the UM mode;
for a UM sending end, the cached data to be forwarded in the UM mode includes: all unsent data packets, or, the cached data to be forwarded in the UM mode includes: all unsent data packets, and data packets that have been sent with no HARQ ACK being received; and/or for a UM receiving end, the cached data to be forwarded in the UM mode includes: a data packet that has not been detected by a reordering timer.

Further, the first node is a first secondary node, the second node is a second secondary node, the first secondary node and the second secondary node share a same master control node, the PDCP protocol stack and an RLC_H protocol stack are located at the master control node, and an RLC_L protocol stack and other protocol stacks below a RLC_L layer are respectively located at the first secondary node and the second secondary node;

the receiving, by the first node, an indication message from a network side includes:
receiving, by the first secondary node, an indication message sent by the master control node; and
the negotiating, by the first node, with the second node to reserve RLC status information and cached data of all the bearers of the user equipment includes:
resetting, by the first secondary node, protocol stack entities at and below the RLC_L layer:

Further, the first node is a first evolved base station, the second node is a second evolved base station, and the negotiating, by the first node, with the second node to reserve RLC status information and cached data of all the bearers of the user equipment includes:
sending, by the first evolved base station, a handover preparation command to the second evolved base station, to ask whether the second evolved base station agrees to hold a layer 2 status; and
performing, by the first evolved base station, an operation of holding the layer 2 status in a case that a handover feedback signaling from the second evolved base station indicates that the second evolved base station agrees to hold the layer 2 status, otherwise, performing a status forwarding on a PDCP protocol stack entity and resetting remaining protocol stack entities.

Further, the performing, by the first evolved base station, an operation of holding the layer 2 status includes:
determining, by the first evolved base station, whether a security parameter is capable of maintaining unchanged;
forwarding, by the first evolved base station, a status and data of an RLC layer to the second evolved base station, in a case that the security parameter is capable of maintaining unchanged;
determining, by the first evolved base station, whether a received segment of a PDCP protocol data unit (PDU) is able to be successfully decrypted, based on a security algorithm, in a case that the security parameter needs to be updated; sending, by the first evolved base station, all received PDCP PDU segments to the PDCP layer for decryption to recover a PDCP service data unit (SDU) segment, and forwarding the recovered segment to the second evolved base station, in a case that the received segment is able to be successfully decrypted; and deleting, by the first evolved base station, the received segment of the PDCP PDU, recording at the RLC layer that the entire PDCP PDU is lost, updating the status of the RLC layer, deleting a cache associated with the segment of the PDCP PDU, and forwarding the updated status of the RLC layer and the remaining data to the second evolved base station, in a case that the received segment is unable to be successfully decrypted.

A method for processing information applied to a second node is further provided according to an embodiment of the present disclosure. The method includes:

negotiating, by the second node, with a first node to reserve radio link control protocol (RLC) status information and cached data of all bearers of a user equipment, where the user equipment is to handover from the first node to the second node; and
providing, by the second node, the user equipment with a continuing data service based on the reserved information.

Further, the first node is a first secondary node, the second node is a second secondary node, the first secondary node and the second secondary node share a same master control node, a Packet Data Convergence Protocol (PDCP) protocol stack is located at the master control node, and an RLC protocol stack and other protocol stacks below the RLC protocol stack are respectively located at the first secondary node and the second secondary node; and the negotiating, by the second node, with the first node to reserve RLC status information and cached data of all bearers of a user equipment includes:
receiving, by the second secondary node, the RLC status information and the cached data of all the bearers of the user equipment sent by the first secondary node; and
storing, by the second secondary node, status variables and information of all the bearers of the user equipment based on the RLC status information and the cached data.

Further, the first node is a first secondary node, the second node is a second secondary node, the first secondary node and the second secondary node share a same master control node, a PDCP protocol stack and an RLC_H protocol stack are located at the master control node, an RLC_L protocol stack and other protocol stacks below an RLC_L layer are respectively located at the first secondary node and the second secondary node, and the negotiating, by the second node, with the first node to reserve RLC status information and cached data of all bearers of a user equipment includes:
reconstructing, by the second secondary node, an RLC_L protocol stack entity and protocol stack entities below the RLC_L layer, and initializing each of the constructed protocol stack entities.

Further, the first node is a first evolved base station, the second node is a second evolved base station, and the negotiating, by the second node, with the first node to reserve RLC status information and cached data of all bearers of the user equipment includes:
receiving, by the second evolved base station, a handover preparation command sent by the first evolved base station, where the handover preparation command asks whether to agree to hold a layer 2 status; and
feeding, by the second evolved base station, a handover feedback signaling back to the first evolved base station, to indicate whether to agree to hold the layer 2 status.

A method for processing information applied to a user equipment is further provided according to an embodiment of the present disclosure. The method includes:
receiving, by the user equipment, an indication message sent by a network side, where the indication message indicates the user equipment to hand over from a first node to a second node, and the indication message carries an indication field related to layer 2 information processing; and
processing, by the user equipment, layer 2 information in response to the indication message, to hand over from the first node to the second node.

Further, the first node is a first secondary node, the second node is a second secondary node, the first secondary node and the second secondary node share a same master control node, the PDCP protocol stack and an RLC_H protocol stack are located at the master control node, and an RLC_L protocol stack and other protocol stacks below an RLC_L layer are respectively located at the first secondary node and the second secondary node; and the processing, by the user equipment, layer 2 information in response to the indication message includes:

resetting, by the user equipment, all protocol stack entities at a physical MAC layer and below the physical MAC layer;

directly determining, by the user equipment, a receiving Gap of data on which the RLC is performing a reordering detection as a packet loss instead of waiting, resetting a reordering timer and updating a variable of a reordering record, determining all Gaps in a current receiving queue as packet losses, and updating a maximum value of SNs included in the status report to be a maximum value of SNs of the currently-received data packets or to be the maximum value plus one;

feeding, by the user equipment, a status report back to the network side, where the status report carries the maximum value ACK_SN of the SNs of the received data packets, and carries a list of SNs of data packets that are determined as lost packets; and maintaining, by the user equipment, all statuses of the PDCP protocol stack entity.

Further, the status report further includes segmentation information of a lost portion of the received data packet, the segmentation information is in a form of SO+LI, where SO indicates a starting position of the lost portion in the data packet, and LI indicates length information of the lost packet, to request retransmission of the lost portion; and the segmentation information also includes information indicating whether the portion is a last segment of the data packet.

Further, the first node is a first evolved base station, the second node is a second evolved base station, and the processing, by the user equipment, layer 2 information in response to the indication message includes:

not resetting, by the user equipment, the RLC protocol stack entity in a case that the indication message carries an indication of not resetting the RL;

reserving, by the user equipment, the PDCP and the RLC protocol stack entities, resetting protocol stack entities at and below an MAC layer, determining all receiving Gaps as packet losses, and feeding back a status report, in a case that the security parameter is able to maintain unchanged;

determining, by the user equipment, whether incomplete PDCP PDU data is able to be decrypted, based on a security algorithm, in a case that the security parameter needs to be updated; deleting, by the user equipment, all received data, determining an RLC PDU corresponding to the deleted data or a PDU segment in the deleted data as a packet loss, recording a NACK in the status record, and deleting data in an RLC cache, when the incomplete PDCP PDU data is unable to be decrypted; and sending, by the user equipment, partially-received data to the PDCP layer for decryption when the incomplete PDCP PDU data is able to be decrypted, and when the decryption is successful, determining that an RLC PDU corresponding to the successfully-decrypted data or a PDU segment in the successfully-decrypted data is correctly received, recording an ACK in the status update and deleting data in the RLC cache.

A device for processing information applied to a first node is further provided according to an embodiment of the present disclosure. The device includes:

a receiving module, configured to receive an indication message from a network side, where the indication message indicates a user equipment under the first node to hand over to a second node; and a processing module, configured to negotiate with the second node to reserve radio link layer control protocol (RLC) status information and cached data of all bearers of the user equipment, in such a manner that the second node provides a continuing data service to the user equipment based on the reserved information.

Further, the first node is a first secondary node, the second node is a second secondary node, and the first secondary node and the second secondary node share a same master control node; a Packet Data Convergence Protocol (PDCP) protocol stack is located at the master control node, and an RLC protocol stack and other protocol stacks below the RLC protocol stack are respectively located at the first secondary node and the second secondary node;

the receiving module is configured to receive an indication message sent by the master control node; and the processing module is configured to forward the RLC status information and the cached data of all the bearers of the user equipment to the second secondary node.

Further, the device further includes:

a sending module, configured to trigger a new status report immediately formed in response to a current receiving status, and send the new status report to the user equipment, where the status report includes a maximum value (ACK_SN) of SNs of data packets that have been correctly received in the uplink, and the status report also includes SNs or segmentation information of all the data packets within the ACK_SN that have not been successfully received.

Further, in a case that a direct interface exists between the first secondary node and the second secondary node, the processing module is configured to forward the RLC status information and the cached data of all the bearers of the user equipment to the second secondary node via the direct interface; and in a case that no direct interface exists between the first secondary node and the second secondary node, the processing module is configured to forward the RLC status information and the cached data of all the bearers of the user equipment to the second secondary node via the master control node.

Further, the RLC status information includes acknowledged mode (AM) status information;

for an AM sending end, the AM status information includes one or more types of the following information: a sequence number (SN) of a next to-be-sent data packet, an sN of a next acknowledged successfully-sent data packet, and configuration information of a poll module (Poll), and the configuration information of the Poll includes one or more types of the following information: triggering the Poll every other preset quantity of SNs or every other preset quantity of bytes, the accumulative total quantity of SNs or the accumulative total quantity of bytes from the last Poll triggering to a current time instant, and a maximum SN number recorded during a last Poll triggering; and for an AM receiving end, the AM status information includes one or more types of the following information: a maximum value of SNs of data packets correctly and completely received in sequence or the maximum value plus one, a maximum value of SNs of within-receiving-window data packets as received or the maximum value plus one, and a maximum value of SNs capable of being included in the status report or the maximum value plus one; or for an AM sending end, the AM status information includes: an SN of a first data packet that has been sent with no ARQ ACK acknowledgement being received from a peer end, and a corresponding bit stream, where the bit stream indicates whether each data packet sent after the first data packet receives an ARQ ACK acknowledgement; and for an AM receiving end, the AM status information includes: an SN of a first unreceived data packet and a corresponding bit, where the bit stream indicates a receiving situation of each data packet after the first unreceived data packet.

Further, the cached data includes cached data to be forwarded in the AM mode;

for an AM sending end, the cached data to be forwarded in the AM mode includes: all data packets that have been sent with no ARQ ACK being received or all data packets after a first data packet that has been sent with no ARQ ACK being received, and all data packets that are not sent and are cached in a sending cache; and for an AM receiving end, the cached data to be forwarded in the AM mode includes: all data packets in the receiving cache.

Further, for the AM sending end, the cached data to be forwarded in the AM mode further includes the quantity of times that all data packets having been sent are sent; and for the AM receiving end, in a case that data in the receiving cache is a portion of a data packet, the cached data to be forwarded in the AM mode further includes segmentation information of the portion of the data packet.

Further, the segmentation information is in a form of SO+LI, SO indicates a starting position of the portion in the data packet, and LI indicates length information of the portion; and the segmentation information also includes information indicating whether the portion is a last segment of the data packet.

Further, the RLC status information includes unacknowledged mode (UM) status information;

for a UM sending end, the UM status information includes an SN of a data packet to be sent next; and for a UM receiving end, the UM status information includes a maximum value of SNs of received data packets or the maximum value minus one.

Further, the cached data includes cached data to be forwarded in a UM mode;

for a UM sending end, the cached data to be forwarded in the UM mode includes: all unsent data packets, or, the cached data to be forwarded in the UM mode includes: all unsent data packets, and data packets that have been sent with no HARQ ACK being received; and/or for a UM receiving end, the cached data to be forwarded in the UM mode includes: a data packet that has not been detected by a reordering timer.

Further, the first node is a first secondary node, the second node is a second secondary node, the first secondary node and the second secondary node share a same master control node, the PDCP protocol stack and an RLC_H protocol stack are located at the master control node, and an RLC_L protocol stack and other protocol stacks below a RLC_L layer are respectively located at the first secondary node and the second secondary node;

the receiving module is configured to receive an indication message sent by the master control node; and the processing module is configured to reset protocol stack entities at and below the RLC_L layer.

Further, the first node is a first evolved base station, the second node is a second evolved base station, and the processing module includes:

a sending unit, configured to send a handover preparation command to the second evolved base station, to ask whether the second evolved base station agrees to hold a layer 2 status; and a performing unit, configured to perform an operation of holding the layer 2 status in a case that a handover feedback signaling from the second evolved base station indicates that the second evolved base station agrees to hold the layer 2 status, otherwise, configured to perform a status forwarding on a PDCP protocol stack entity and reset remaining protocol stack entities.

Further, the performing unit is configured to: determine whether a security parameter is capable of maintaining unchanged;

forward a status and data of an RLC layer to the second evolved base station, in a case that the security parameter is capable of maintaining unchanged;

determine whether a received segment of a PDCP protocol data unit (PDU) is able to be successfully decrypted, based on a security algorithm, in a case that the security parameter needs to be updated; send all received PDCP PDU segments to the PDCP layer for decryption to recover a PDCP service data unit (SDU) segment, and forward the recovered segment to the second evolved base station, in a case that the received segment is able to be successfully decrypted; and delete the received segment of the PDCP PDU, record at the RLC layer that the entire PDCP PDU is lost, update the status of the RLC layer, delete a cache associated with the segment of the PDCP PDU, and forward the updated status of the RLC layer and the remaining data to the second evolved base station, in a case that the received segment is unable to be successfully decrypted.

A device for processing information applied to a second node is further provided according to an embodiment of the present disclosure. The device includes:

a handover module, configured to negotiate with a first node to reserve radio link layer control protocol (RLC) status information and cached data of all bearers of a user equipment, where the user equipment is to hand over from the first node to the second node; and a data transmission module, configured to provide the user equipment with a continuing data service based on the reserved information.

Further, the first node is a first secondary node, the second node is a second secondary node, the first secondary node and the second secondary node share a same master control node, a Packet Data Convergence Protocol (PDCP) protocol stack is located at the master control node, an RLC protocol stack and other protocol stacks below the RLC protocol stack are respectively located at the first secondary node and the second secondary node, and the handover module includes:

a receiving unit, configured to receive the RLC status information and the cached data of all the bearers of the user equipment sent by the first secondary node; and a storage unit, configured to store status variables and information of all the bearers of the user equipment based on the RLC status information and the cached data.

Further, the first node is a first secondary node, the second node is a second secondary node, the first secondary node and the second secondary node share a same master control node, a PDCP protocol stack and an RLC_H protocol stack are located at the master control node, and an RLC_L protocol stack and other protocol stacks below an RLC_L layer are respectively located at the first secondary node and the second secondary node; and the handover module is configured to reconstruct an RLC_L protocol stack entity and protocol stack entities below the RLC_L layer, and initialize each of the constructed protocol stack entities.

Further, the first node is a first evolved base station, the second node is a second evolved base station, and the handover module includes:

a receiving unit, configured to receive a handover preparation command sent by the first evolved base station, where the handover preparation command asks whether to agree to hold a layer 2 status; and a sending unit, configured to feed a handover feedback signaling back to the first evolved base station, to indicate whether to agree to hold the layer 2 status.

A device for processing information applied to a user equipment is further provided according to an embodiment of the present disclosure. The device includes:

a receiving module, configured to receive an indication message sent by a network side, where the indication message indicates the user equipment to hand over from a first node to a second node, and the indication message carries an indication field related to layer 2 information processing; and a handover module, configured to process layer 2 information in response to the indication message, to hand over from the first node to the second node.

Further, the first node is a first secondary node, the second node is a second secondary node, the first secondary node and the second secondary node share a same master control node, the PDCP protocol stack and an RLC_H protocol stack are located at the master control node, and an RLC_L protocol stack and other protocol stacks below an RLC_L layer are respectively located at the first secondary node and the second secondary node; and the handover module is configured to: reset all protocol stack entities at a physical MAC layer and below the physical MAC layer;

determine a receiving Gap of data on which the RLC is performing a reordering detection directly as a packet loss instead of waiting, reset a reordering timer and update a variable of a reordering record, determine all Gaps in a current receiving queue as packet losses, and update a maximum value of SNs included in the status report to be a maximum value of SNs of the currently-received data packets or to be the maximum value plus one;

feed a status report back to the network side, where the status report carries the maximum value ACK_SN of the SNs of the received data packets, and carries a list of SNs of data packets that are determined as lost packets; and maintain all statuses of the PDCP protocol stack entity.

Further, the status report further includes segmentation information of a lost portion of the received data packet, the segmentation information is in a form of SO+LI, where SO indicates a starting position of the lost portion in the data packet, and LI indicates length information of the lost packet, to request retransmission of the lost portion; and the segmentation information also includes information indicating whether the portion is a last segment of the data packet.

Further, the first node is a first evolved base station, and the second node is a second evolved base station.

The handover module is configured: not reset the RLC protocol stack entity in a case that the indication message carries an indication of not resetting the RLC;

reserve the PDCP and the RLC protocol stack entities, reset protocol stack entities at and below an MAC layer, determine all receiving Gaps as packet losses, and feed back a status report, in a case that the security parameter is able to maintain unchanged;

determine whether incomplete PDCP PDU data is able to be decrypted, based on a security algorithm, in a case that the security parameter needs to be updated; delete all received data, determine an RLC PDU corresponding to the deleted data or a PDU segment in the deleted data as a packet loss, record a NACK in the status record, and delete data in an RLC cache, when the incomplete PDCP PDU data is unable to be decrypted; and send partially-received data to the PDCP layer for decryption when the incomplete PDCP PDU data is able to be decrypted, and when the decryption is successful, determine that an RLC PDU corresponding to the successfully-decrypted data or a PDU segment in the successfully-decrypted data is correctly received, record an ACK in the status update and delete data in the RLC cache.

A device for processing information applied to a first node is further provided according to an embodiment of the present disclosure. The device includes a processor and a memory. The processor is configured to execute programs stored in the memory to: receive an indication message from a network side, where the indication message indicates a user equipment under the first node to hand over to the second node; and negotiate with the second node to reserve radio link layer control protocol (RLC) status information and cached data of all bearers of the user equipment, so that the second node provides a continuing data service to the user equipment based on the reserved information.

A device for processing information applied to a second node is further provided according to an embodiment of the present disclosure. The device includes a processor and a memory. The processor is configured to execute programs stored in the memory to: negotiate with a first node to reserve radio link layer control protocol (RLC) status information and cached data of all bearers of a user equipment, where the user equipment is to hand over from the first node to the second node; and provide the user equipment with a continuing data service based on the reserve information.

A device for processing information applied to a user equipment is further provided according to an embodiment of the present disclosure. The device includes a processor and a memory. The processor is configured to execute programs stored in the memory to: receive an indication message sent by a network side, the indication message indicating a user equipment to hand over from a first node to a second node and carrying an indication field related to layer 2 information processing; and process layer 2 information in response to the indication message, to hand over from the first node to the second node.

A computer readable storage medium is further provided according to an embodiment of the present disclosure, on which programs are stored. When the programs are executed by a processer, any one of the above methods for processing information applied to a first node is implemented.

A computer readable storage medium is further provided according to an embodiment of the present disclosure, on which programs are stored. When the programs are executed by a processer, any one of the above methods for processing information applied to a second node is implemented.

A computer readable storage medium is further provided according to an embodiment of the present disclosure, on which programs are stored. When the programs are executed by a processer, any one of the above methods for processing information applied to a user equipment is implemented.

The embodiments of the present disclosure have the following advantageous effects.

In the above solutions, during a handover of the user equipment, the L2 status is maintained to the greatest extent possible. As such, when the user equipment moves between transmission nodes, the continuity of transmission status information of the user equipment can be maintained, and a target node can provide a continuing transmission service based on a latest status of the user equipment, thereby avoiding a reset of all status information of the user equipment and a reduction of transmission rate, and finally improving the network efficiency and the user experience.

DETAILED DESCRIPTION

In order to make the technical problems that need to be solved, the technical solutions, and the advantages of embodiments of the present disclosure clearer, the following detailed description is given hereinafter in conjunction with the accompanying drawings and specific embodiments.

In the related art, a status of L2 needs to be reset each time a service node is changed. Therefore, on one hand, the user experience is affected, and on the other hand, unnecessary retransmission caused by the reset may also reduce the system efficiency. In view of this, a method for processing information and a device for processing information are provided according to embodiments of the present disclosure, which can ensure that a user equipment (UE) moves quickly and efficiently between nodes, so as to improve the user experience in a handover between nodes and improve the efficiency of data transmission of the network.

First Embodiment

Figure 1:
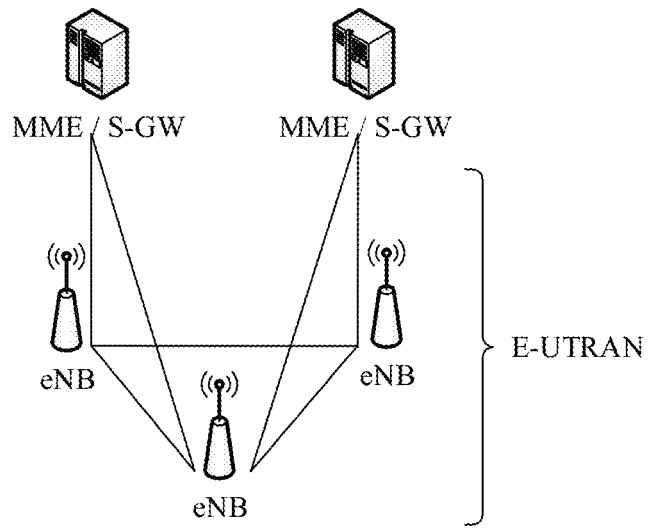
FIG. 1 is a schematic diagram of a user plane protocol stack in an existing mobile communication system.
Figure 2:
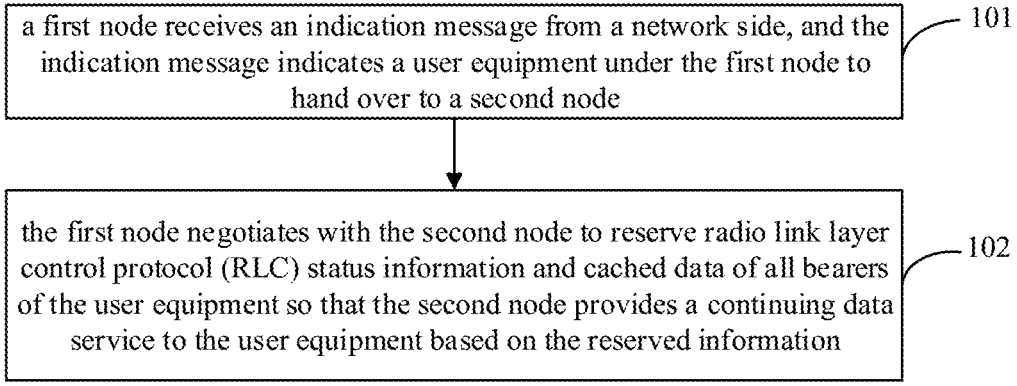
FIG. 2 is a schematic flowchart of a method for processing information according to a first embodiment of the present disclosure.

A method for processing information applied to a first node is provided according to the embodiment. As shown in FIG. 2, the method includes steps 101 to 102.

In step 101, a first node receives an indication message from a network side. The indication message indicates a user equipment under the first node to hand over to a second node.

In step 102, the first node negotiates with the second node to reserve radio link layer control protocol (RLC) status information and cached data of all bearers of the user equipment so that the second node provides a continuing data service to the user equipment based on the reserved information.

The indication message may be a handover message or a reconfiguration message.

The first node is a source cell, a source base station or a source secondary node. The second node is a target cell, a target base station or a target secondary node. The first node and the second node may be located in different devices, or may be two different parts of a same device.

In the embodiment, during a handover of the user equipment, the L2 status is maintained to the greatest extent possible. As such, when the user equipment moves between transmission nodes, the continuity of transmission status information of the user equipment can be maintained, and a target node can provide a continuing transmission service based on a latest status of the user equipment, thereby avoiding a reset of all status information of the user equipment and a reduction of transmission rate, and finally improving the network efficiency and the user experience.

In a specific implementation, the first node is a first secondary node, the second node is a second secondary node, the first secondary node and the second secondary node share a same master control node, a Packet Data Convergence Protocol (PDCP) protocol stack is located at the master control node, and an RLC protocol stack and other protocol stacks below the RLC protocol stack are respectively located at the first secondary node and the second secondary node;

the receiving, by the first node, an indication message from a network side includes:
receiving, by the first secondary node, an indication message sent by the master control node; and
the negotiating, by the first node, with the second node to reserve RLC status information and cached data of all the bearers of the user equipment includes:
forwarding, by the first secondary node, the RLC status information and the cached data of all the bearers of the user equipment, to the second secondary node.

Further, after the indication message sent by the master control node is received by the first secondary node, the method further includes:
immediately triggering and forming, by the first secondary node, a new status report in response to a current receiving status, and sending the new status report to the user equipment, where the status report includes a maximum value (ACK_SN) of SNs of data packets that have been correctly received in the uplink, and the status report also includes SNs or segmentation information of all the data packets within the ACK_SN that have not been successfully received.

In a specific implementation, in a case that a direct interface exists between the first secondary node and the second secondary node, the first secondary node forwards the RLC status information and the cached data of all the bearers of the user equipment to the second secondary node via the direct interface; and in a case that no direct interface exists between the first secondary node and the second secondary node, the first secondary node forwards the RLC status information and the cached data of all the bearers of the user equipment to the second secondary node via the master control node.

Further, the RLC status information includes acknowledged mode (AM) status information;

for an AM sending end, the AM status information includes one or more types of the following information: a sequence number (SN) of a next to-be-sent data packet, an sN of a next acknowledged successfully-sent data packet, and configuration information of a Poll, and the configuration information of the Poll includes one or more types of the following information: triggering the Poll every other preset quantity of SNs or every other preset quantity of bytes, the accumulative total quantity of SNs or the accumulative total quantity of bytes from the last Poll triggering to a current time instant, and a maximum SN number recorded during the last Poll triggering; and for an AM receiving end, the AM status information includes one or more types of the following information: a maximum value of SNs of data packets correctly and completely received in sequence or the maximum value plus one, a maximum value of SNs of within-receiving-window data packets as received or the maximum value plus one, and a maximum value of SNs capable of being included in the status report or the maximum value plus one; or for an AM sending end, the AM status information includes: an SN of a first data packet that has been sent with no ARQ ACK acknowledgement being received from a peer end, and a corresponding bit stream, where the bit stream indicates whether each data packet sent after the first data packet receives an ARQ ACK acknowledgement; and for an AM receiving end, the AM status information includes: an SN of a first unreceived data packet and a corresponding bit stream, where the bit stream indicates a receiving situation of each data packet after the first unreceived data packet.

Further, the cached data includes cached data to be forwarded in the AM mode;

for an AM sending end, the cached data to be forwarded in the AM mode includes: all data packets that have been sent with no ARQ ACK being received or all data packets after a first data packet that has been sent with no ARQ ACK being received, and all data packets that are not sent and are cached in a sending cache; and for an AM receiving end, the cached data to be forwarded in the AM mode includes: all data packets in the receiving cache.

Further, for the AM sending end, the cached data to be forwarded in the AM mode further includes the quantity of times that all data packets having been sent are sent; and for the AM receiving end, in a case that data in the receiving cache is a portion of a data packet, the cached data to be forwarded in the AM mode further includes segmentation information of the portion of the data packet.

Further, the segmentation information is in a form of SO+LI, SO indicates a starting position of the portion in the data packet, and LI indicates length information of the portion; and the segmentation information also includes information indicating whether the portion is a last segment of the data packet.

Further, the RLC status information includes unacknowledged mode (UM) status information;

for a UM sending end, the UM status information includes an SN of a data packet to be sent next; and for a UM receiving end, the UM status information includes a maximum value of SNs of received data packets or the maximum value minus one.

Further, for a UM receiving end, the UM status information further includes a status variable of a reordering, including a lower boundary of the reordering and/or an SN of a data packet triggering the reordering.

Further, the cached data includes cached data to be forwarded in the UM mode;

for a UM sending end, the cached data to be forwarded in the UM mode includes: all unsent data packets; and/or for a UM receiving end, the cached data to be forwarded in the UM mode includes: a data packet that has not been detected by a reordering timer.

Further, for a UM sending end, the cached data to be forwarded in the UM mode includes: data packets that have been sent with no HARQ ACK being received.

Further, if the forwarded data packet is allocated with an SN of the RLC, the cached data to be forwarded further includes the SN of the data packet; and if the forwarded data packet is not allocated with an SN of the RLC, the data packet is forwarded in the same order as the data packet is received.

In a specific implementation, the first node is a first secondary node, the second node is a second secondary node, the first secondary node and the second secondary node share a same master control node, the PDCP protocol stack and an RLC_H protocol stack are located at the master control node, and an RLC_L protocol stack and other protocol stacks below a RLC_L layer are respectively located at the first secondary node and the second secondary node;

the receiving, by the first node, an indication message from a network side includes:

receiving, by the first secondary node, an indication message sent by the master control node; and the negotiating, by the first node, with the second node to reserve RLC status information and cached data of all the bearers of the user equipment includes:

resetting, by the first secondary node, protocol stack entities at and below the RLC_L layer.

In a specific implementation, the first node is a first evolved base station, the second node is a second evolved base station, and the negotiating, by the first node, with the second node to reserve RLC status information and cached data of all the bearers of the user equipment includes:

sending, by the first evolved base station, a handover preparation command to the second evolved base station, to ask whether the second evolved base station agrees to hold a layer 2 status; and performing, by the first evolved base station, an operation of holding the layer 2 status in a case that a handover feedback signaling from the second evolved base station indicates that the second evolved base station agrees to hold the layer 2 status, otherwise, performing a status forwarding on a PDCP protocol stack entity and resetting remaining protocol stack entities.

Further, the performing, by the first evolved base station, an operation of holding the layer 2 status includes:
determining, by the first evolved base station, whether a security parameter is capable of maintaining unchanged;
forwarding, by the first evolved base station, a status and data of an RLC layer to the second evolved base station, in a case that the security parameter is capable of maintaining unchanged;
determining, by the first evolved base station, whether a received segment of a PDCP protocol data unit (PDU) is able to be successfully decrypted, based on a security algorithm, in a case that the security parameter needs to be updated; sending, by the first evolved base station, all received PDCP PDU segments to the PDCP layer for decryption to recover a PDCP service data unit (SDU) segment, and forwarding the recovered segment to the second evolved base station, in a case that the received segment is able to be successfully decrypted; and deleting, by the first evolved base station, the received segment of the PDCP PDU, recording at the RLC layer that the entire PDCP PDU is lost, updating the status of the RLC layer, deleting a cache associated with the segment of the PDCP PDU, and forwarding the updated status of the RLC layer and the remaining data to the second evolved base station, in a case that the received segment is unable to be successfully decrypted.

Second Embodiment

Figure 3:
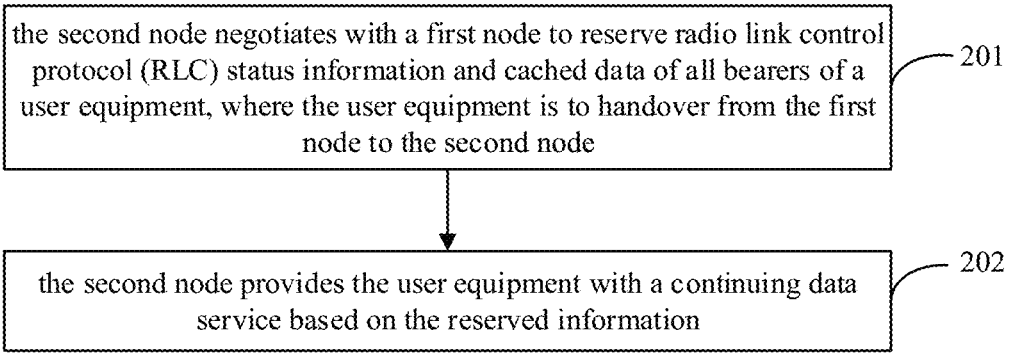
FIG. 3 is a schematic flowchart of a method for processing information according to a second embodiment of the present disclosure.

A method for processing information applied to a second node is provided according to the embodiment. As shown in FIG. 3, the method includes steps 201 to 202.

In step 201, the second node negotiates with a first node to reserve radio link control protocol (RLC) status information and cached data of all bearers of a user equipment, where the user equipment is to handover from the first node to the second node.

In step 202, the second node provides the user equipment with a continuing data service based on the reserved information.

The first node is a source cell, a source base station or a source secondary node. The second node is a target cell, a target base station or a target secondary node. The first node and the second node may be located in different devices, or may be two different parts of a same device.

In the embodiment, during a handover of the user equipment, the L2 status is maintained to the greatest extent possible. As such, when the user equipment moves between transmission nodes, the continuity of transmission status information of the user equipment can be maintained, and a target node can provide a continuing transmission service based on a latest status of the user equipment, thereby avoiding a reset of all status information of the user equipment and a reduction of transmission rate, and finally improving the network efficiency and the user experience.

In a specific implementation, the first node is a first secondary node, the second node is a second secondary node, the first secondary node and the second secondary node share a same master control node, a Packet Data Convergence Protocol (PDCP) protocol stack is located at the master control node, and an RLC protocol stack and other protocol stacks below the RLC protocol stack are respectively located at the first secondary node and the second secondary node; and the negotiating, by the second node, with the first node to reserve RLC status information and cached data of all bearers of a user equipment includes:
receiving, by the second secondary node, the RLC status information and the cached data of all the bearers of the user equipment sent by the first secondary node; and
storing, by the second secondary node, status variables and information of all the bearers of the user equipment based on the RLC status information and the cached data.

In a specific implementation, the first node is a first secondary node, the second node is a second secondary node, the first secondary node and the second secondary node share a same master control node, a PDCP protocol stack and an RLC_H protocol stack are located at the master control node, an RLC_L protocol stack and other protocol stacks below an RLC_L layer are respectively located at the first secondary node and the second secondary node, and the negotiating, by the second node, with the first node to reserve RLC status information and cached data of all bearers of a user equipment includes:
reconstructing, by the second secondary node, an RLC_L protocol stack entity and protocol stack entities below the RLC_L layer, and initializing each of the constructed protocol stack entities.

In a specific implementation, the first node is a first evolved base station, the second node is a second evolved base station, and the negotiating, by the second node, with the first node to reserve RLC status information and cached data of all bearers of the user equipment includes:
receiving, by the second evolved base station, a handover preparation command sent by the first evolved base station, where the handover preparation command asks whether to agree to hold a layer 2 status; and
feeding, by the second evolved base station, a handover feedback signaling back to the first evolved base station, to indicate whether to agree to hold the layer 2 status.

Third Embodiment

Figure 4:
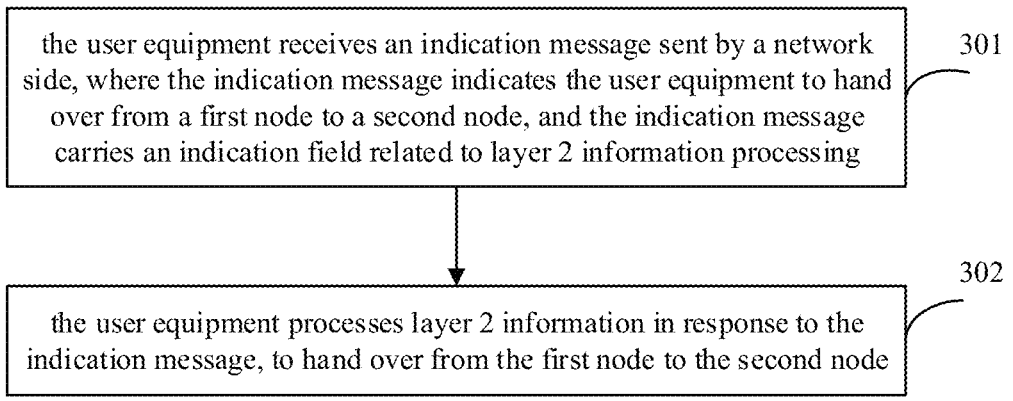
FIG. 4 is a schematic flowchart of a method for processing information according to a third embodiment of the present disclosure.

A method for processing information applied to a user equipment is further provided according to an embodiment of the present disclosure. As shown in FIG. 4, the method includes steps 301 and 302.

In step 301, the user equipment receives an indication message sent by a network side, where the indication message indicates the user equipment to hand over from a first node to a second node, and the indication message carries an indication field related to layer 2 information processing.

In step 302, the user equipment processes layer 2 information in response to the indication message, to hand over from the first node to the second node.

The indication message may be a handover message or a reconfiguration message.

The first node is a source cell, a source base station or a source secondary node. The second node is a target cell, a target base station or a target secondary node. The first node and the second node may be located in different devices, or may be two different parts of a same device. Whether to reset the user equipment is determined by the target cell, target base station or target secondary node.

In the embodiment, during a handover of the user equipment, the L2 status is maintained to the greatest extent possible. As such, when the user equipment moves between transmission nodes, the continuity of transmission status information of the user equipment can be maintained, and a target node can provide a continuing transmission service based on a latest status of the user equipment, thereby avoiding a reset of all status information of the user equipment and a reduction of transmission rate, and finally improving the network efficiency and the user experience.

In a specific implementation, the first node is a first secondary node, the second node is a second secondary node, the first secondary node and the second secondary node share a same master control node, the PDCP protocol stack and an RLC_H protocol stack are located at the master control node, and an RLC_L protocol stack and other protocol stacks below an RLC_L layer are respectively located at the first secondary node and the second secondary node; and the processing, by the user equipment, layer 2 information in response to the indication message includes:

resetting, by the user equipment, all protocol stack entities at a physical MAC layer and below the physical MAC layer;

directly determining, by the user equipment, a receiving Gap of data on which the RLC is performing a reordering detection as a packet loss instead of waiting, resetting a reordering timer and updating a variable of a reordering record, determining all Gaps in a current receiving queue as packet losses, and updating a maximum value of SNs included in the status report to be a maximum value of SNs of the currently-received data packets or to be the maximum value plus one;

feeding, by the user equipment, a status report back to the network side, where the status report carries the maximum value ACK_SN of the SNs of the received data packets, and carries a list of SNs of data packets that are determined as lost packets; and maintaining, by the user equipment, all statuses of the PDCP protocol stack entity.

Further, the status report further includes segmentation information of a lost portion of the received data packet, the segmentation information is in a form of SO+LI, where SO indicates a starting position of the lost portion in the data packet, and LI indicates length information of the lost packet, to request retransmission of the lost portion; and the segmentation information also includes information indicating whether the portion is a last segment of the data packet. That is, the segmentation information is in the form of SO+LI+LSF. If the portion is the last segment, LSF is set to 1. Otherwise, LSF is set to 0.

In a specific implementation, the first node is a first evolved base station, the second node is a second evolved base station, and the processing, by the user equipment, layer 2 information in response to the indication message includes:

not resetting, by the user equipment, the RLC protocol stack entity in a case that the indication message carries an indication of not resetting the RLC;

reserving, by the user equipment, the PDCP and the RLC protocol stack entities, resetting protocol stack entities at and below an MAC layer, determining all receiving Gaps as packet losses, and feeding back a status report, in a case that the security parameter is able to maintain unchanged;

determining, by the user equipment, whether incomplete PDCP PDU data is able to be decrypted, based on a security algorithm, in a case that the security parameter needs to be updated; deleting, by the user equipment, all received data, determining an RLC PDU corresponding to the deleted data or a PDU segment in the deleted data as a packet loss, recording a NACK in the status record, and deleting data in an RLC cache, when the incomplete PDCP PDU data is unable to be decrypted; and sending, by the user equipment, partially-received data to the PDCP layer for decryption when the incomplete PDCP PDU data is able to be decrypted, and when the decryption is successful, determining that an RLC PDU corresponding to the successfully-decrypted data or a PDU segment in the successfully-decrypted data is correctly received, recording an ACK in the status update and deleting data in the RLC cache.

Fourth Embodiment

Figure 5:
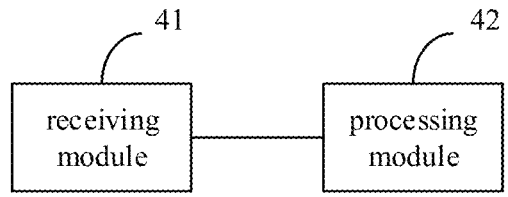
FIG. 5 is a structural block diagram of a device for processing information according to a fourth embodiment of the present disclosure.

A device for processing information applied to a first node is further provided according to the fourth embodiment of the present disclosure. The device includes a processor and a memory connected to the processor via a bus interface. The memory is configured to store programs and data used by the processor when performing operations. When the processor calls and executes the programs and data stored in the memory, the following functional modules or units are implemented, as shown in FIG. 5.

A receiving module 41 is configured to receive an indication message from a network side, where the indication message indicates a user equipment under the first node to hand over to a second node.

A processing module 42 is configured to negotiate with the second node to reserve radio link layer control protocol (RLC) status information and cached data of all bearers of the user equipment, in such a manner that the second node provides a continuing data service to the user equipment based on the reserved information.

The indication message may be a handover message or a reconfiguration message.

The first node is a source cell, a source base station or a source secondary node. The second node is a target cell, a target base station or a target secondary node. The first node and the second node may be located in different devices, or may be two different parts of a same device.

In the embodiment, during a handover of the user equipment, the L2 status is maintained to the greatest extent possible. As such, when the user equipment moves between transmission nodes, the continuity of transmission status information of the user equipment can be maintained, and a target node can provide a continuing transmission service based on a latest status of the user equipment, thereby avoiding a reset of all status information of the user equipment and a reduction of transmission rate, and finally improving the network efficiency and the user experience.

In a specific implementation, the first node is a first secondary node, the second node is a second secondary node, and the first secondary node and the second secondary node share a same master control node; a Packet Data Convergence Protocol (PDCP) protocol stack is located at the master control node, and an RLC protocol stack and other protocol stacks below the RLC protocol stack are respectively located at the first secondary node and the second secondary node;

the receiving module is configured to receive an indication message sent by the master control node; and the processing module is configured to forward the RLC status information and the cached data of all the bearers of the user equipment to the second secondary node.

Further, the device further includes:
a sending module, configured to trigger a new status report immediately formed in response to a current receiving status, and send the new status report to the user equipment, where the status report includes a maximum value (ACK_SN) of SNs of data packets that have been correctly received in the uplink, and the status report also includes SNs or segmentation information of all the data packets within the ACK_SN that have not been successfully received.

Further, in a case that a direct interface exists between the first secondary node and the second secondary node,
the processing module is configured to forward the RLC status information and the cached data of all the bearers of the user equipment to the second secondary node via the direct interface; and
in a case that no direct interface exists between the first secondary node and the second secondary node, the processing module is configured to forward the RLC status information and the cached data of all the bearers of the user equipment to the second secondary node via the master control node.

Further, the RLC status information includes acknowledged mode (AM) status information;
for an AM sending end, the AM status information includes one or more types of the following information: a sequence number (SN) of a next to-be-sent data packet, an sN of a next acknowledged successfully-sent data packet, and configuration information of a poll module (Poll), and the configuration information of the Poll includes one or more types of the following information: triggering the Poll every other preset quantity of SNs or every other preset quantity of bytes, the accumulative total quantity of SNs or the accumulative total quantity of bytes from the last Poll triggering to a current time instant, and a maximum SN number recorded during a last Poll triggering, and
for an AM receiving end, the AM status information includes one or more types of the following information: a maximum value of SNs of data packets correctly and completely received in sequence or the maximum value plus one, a maximum value of SNs of within-receiving-window data packets as received or the maximum value plus one, and a maximum value of SNs capable of being included in the status report or the maximum value plus one; or
for an AM sending end, the AM status information includes: an SN of a first data packet that has been sent with no ARQ ACK acknowledgement being received from a peer end, and a corresponding bit stream, where the bit stream indicates whether each data packet sent after the first data packet receives an ARQ ACK acknowledgement, and
for an AM receiving end, the AM status information includes: an SN of a first unreceived data packet and a corresponding bit, where the bit stream indicates a receiving situation of each data packet after the first unreceived data packet.

Further, the cached data includes cached data to be forwarded in the AM mode;
for an AM sending end, the cached data to be forwarded in the AM mode includes: all data packets that have been sent with no ARQ ACK being received or all data packets after a first data packet that has been sent with no ARQ ACK being received, and all data packets that are not sent and are cached in a sending cache; and
for an AM receiving end, the cached data to be forwarded in the AM mode includes: all data packets in the receiving cache.

Further, for the AM sending end, the cached data to be forwarded in the AM mode further includes the quantity of times that all data packets having been sent are sent; and
for the AM receiving end, in a case that data in the receiving cache is a portion of a data packet, the cached data to be forwarded in the AM mode further includes segmentation information of the portion of the data packet.

Further, the segmentation information is in a form of SO+LI, SO indicates a starting position of the portion in the data packet, and LI indicates length information of the portion; and
the segmentation information also includes information indicating whether the portion is a last segment of the data packet.

Further, the RLC status information includes unacknowledged mode (UM) status information;
for a UM sending end, the UM status information includes an SN of a data packet to be sent next; and
for a UM receiving end, the UM status information includes a maximum value of SNs of received data packets or the maximum value minus one.

Further, for a UM receiving end, the UM status information further includes a status variable of a reordering, including a lower boundary of the reordering and/or an SN of a data packet triggering the reordering.

Further, the cached data includes cached data to be forwarded in the UM mode;
for a UM sending end, the cached data to be forwarded in the UM mode includes: all unsent data packets;
for a UM receiving end, the cached data to be forwarded in the UM mode includes: a data packet that has not been detected by a reordering timer.

Further, for a UM sending end, the cached data to be forwarded in the UM mode includes: data packets that have been sent with no HARQ ACK being received.

Further, if the forwarded data packet is allocated with an SN of the RLC, the cached data to be forwarded further includes the SN of the data packet; and
if the forwarded data packet is not allocated with an SN of the RLC, the data packet is forwarded in the same order as the data packet is received.

In a specific implementation, the first node is a first secondary node, the second node is a second secondary node, the first secondary node and the second secondary node share a same master control node, the PDCP protocol stack and an RLC_H protocol stack are located at the master control node, and an RLC_L protocol stack and other protocol stacks below a RLC_L layer are respectively located at the first secondary node and the second secondary node;
the receiving module is configured to receive an indication message sent by the master control node; and
the processing module is configured to reset protocol stack entities at and below the RLC_L layer.

In a specific implementation, the first node is a first evolved base station, the second node is a second evolved base station, and the processing module includes:
a sending unit, configured to send a handover preparation command to the second evolved base station, to ask whether the second evolved base station agrees to hold a layer 2 status; and
a performing unit, configured to perform an operation of holding the layer 2 status in a case that a handover feedback signaling from the second evolved base station indicates that the second evolved base station agrees to hold the layer 2 status, otherwise, configured to perform a status forwarding on a PDCP protocol stack entity and reset remaining protocol stack entities.

Further, the performing unit is configured to: determine whether a security parameter is capable of maintaining unchanged;

forward a status and data of an RLC layer to the second evolved base station, in a case that the security parameter is capable of maintaining unchanged;

determine whether a received segment of a PDCP protocol data unit (PDU) is able to be successfully decrypted, based on a security algorithm, in a case that the security parameter needs to be updated; send all received PDCP PDU segments to the PDCP layer for decryption to recover a PDCP service data unit (SDU) segment, and forward the recovered segment to the second evolved base station, in a case that the received segment is able to be successfully decrypted; and delete the received segment of the PDCP PDU, record at the RLC layer that the entire PDCP PDU is lost, update the status of the RLC layer, delete a cache associated with the segment of the PDCP PDU, and forward the updated status of the RLC layer and the remaining data to the second evolved base station, in a case that the received segment is unable to be successfully decrypted.

Fifth Embodiment

Figure 6:
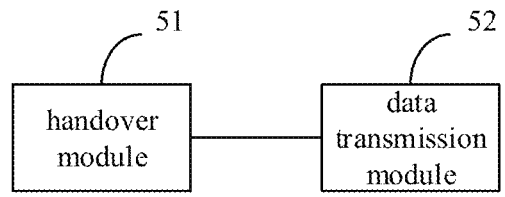
FIG. 6 is a structural block diagram of a device for processing information according to a fifth embodiment of the present disclosure.

A device for processing information applied to a second node is further provided according to the fifth embodiment of the present disclosure. The device includes a processor and a memory connected to the processor via a bus interface. The memory is configured to store programs and data used by the processor when performing operations. When the processor calls and executes the programs and data stored in the memory, the following functional modules or units are implemented, as shown in FIG. 6.

A handover module 51 is configured to negotiate with a first node to reserve radio link layer control protocol (RLC) status information and cached data of all bearers of a user equipment, where the user equipment is to hand over from the first node to the second node.

A data transmission module 52 is configured to provide the user equipment with a continuing data service based on the reserved information.

The first node is a source cell, a source base station or a source secondary node. The second node is a target cell, a target base station or a target secondary node. The first node and the second node may be located in different devices, or may be two different parts of a same device.

In the embodiment, during a handover of the user equipment, the L2 status is maintained to the greatest extent possible. As such, when the user equipment moves between transmission nodes, the continuity of transmission status information of the user equipment can be maintained, and a target node can provide a continuing transmission service based on a latest status of the user equipment, thereby avoiding a reset of all status information of the user equipment and a reduction of transmission rate, and finally improving the network efficiency and the user experience.

In a specific implementation, the first node is a first secondary node, the second node is a second secondary node, the first secondary node and the second secondary node share a same master control node, a Packet Data Convergence Protocol (PDCP) protocol stack is located at the master control node, an RLC protocol stack and other protocol stacks below the RLC protocol stack are respectively located at the first secondary node and the second secondary node, and the handover module includes:

a receiving unit, configured to receive the RLC status information and the cached data of all the bearers of the user equipment sent by the first secondary node; and a storage unit, configured to store status variables and information of all the bearers of the user equipment based on the RLC status information and the cached data.

In a specific implementation, the first node is a first secondary node, the second node is a second secondary node, the first secondary node and the second secondary node share a same master control node, a PDCP protocol stack and an RLC_H protocol stack are located at the master control node, and an RLC_L protocol stack and other protocol stacks below an RLC_L layer are respectively located at the first secondary node and the second secondary node; and the handover module is configured to reconstruct an RLC_L protocol stack entity and protocol stack entities below the RLC_L layer, and initialize each of the constructed protocol stack entities.

In a specific implementation, the first node is a first evolved base station, the second node is a second evolved base station, and the handover module includes:

a receiving unit, configured to receive a handover preparation command sent by the first evolved base station, where the handover preparation command asks whether to agree to hold a layer 2 status; and a sending unit, configured to feed a handover feedback signaling back to the first evolved base station, to indicate whether to agree to hold the layer 2 status.

Sixth Embodiment

Figure 7:
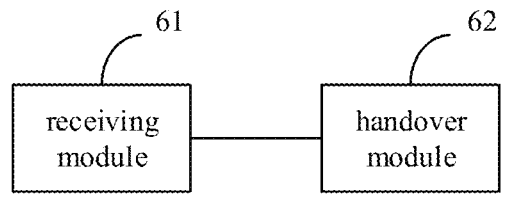
FIG. 7 is a structural block diagram of a device for processing information according to a sixth embodiment of the present disclosure.

A device for processing information applied to a user equipment is further provided according to the sixth embodiment of the present disclosure. The device includes a processor and a memory connected to the processor via a bus interface. The memory is configured to store programs and data used by the processor when performing operations. When the processor calls and executes the programs and data stored in the memory, the following functional modules or units are implemented, as shown in FIG. 7.

A receiving module 61 is configured to receive an indication message sent by a network side, where the indication message indicates the user equipment to hand over from a first node to a second node, and the indication message carries an indication field related to layer 2 information processing.

A handover module 62 is configured to process layer 2 information in response to the indication message, to hand over from the first node to the second node.

The indication message may be a handover message or a reconfiguration message.

The first node is a source cell, a source base station or a source secondary node. The second node is a target cell, a target base station or a target secondary node. The first node and the second node may be located in different devices, or may be two different parts of a same device. Whether to reset the user equipment is determined by the target cell, target base station or target secondary node.

In the embodiment, during a handover of the user equipment, the L2 status is maintained to the greatest extent possible. As such, when the user equipment moves between transmission nodes, the continuity of transmission status information of the user equipment can be maintained, and a target node can provide a continuing transmission service based on a latest status of the user equipment, thereby avoiding a reset of all status information of the user equipment and a reduction of transmission rate, and finally improving the network efficiency and the user experience.

In a specific implementation, the first node is a first secondary node, the second node is a second secondary node, the first secondary node and the second secondary node share a same master control node, the PDCP protocol stack and an RLC_H protocol stack are located at the master control node, and an RLC_L protocol stack and other protocol stacks below an RLC_L layer are respectively located at the first secondary node and the second secondary node, and the handover module is configured to: reset all protocol stack entities at a physical MAC layer and below the physical MAC layer;

determine a receiving Gap of data on which the RLC is performing a reordering detection directly as a packet loss instead of waiting, reset a reordering timer and update a variable of a reordering record, determine all Gaps in a current receiving queue as packet losses, and update a maximum value of SNs included in the status report to be a maximum value of SNs of the currently-received data packets or to be the maximum value plus one;

feed a status report back to the network side, where the status report carries the maximum value ACK_SN of the SNs of the received data packets, and carries a list of SNs of data packets that are determined as lost packets; and maintain all statuses of the PDCP protocol stack entity.

Further, the status report further includes segmentation information of a lost portion of the received data packet, the segmentation information is in a form of SO+LI, where SO indicates a starting position of the lost portion in the data packet, and LI indicates length information of the lost packet, to request retransmission of the lost portion; and the segmentation information also includes information indicating whether the portion is a last segment of the data packet.

In a specific implementation, the first node is a first evolved base station, and the second node is a second evolved base station, the handover module is configured to: not reset the RLC protocol stack entity in a case that the indication message carries an indication of not resetting the RLC;

reserve the PDCP and the RLC protocol stack entities, reset protocol stack entities at and below an MAC layer, determine all receiving Gaps as packet losses, and feed back a status report, in a case that the security parameter is able to maintain unchanged;

determine whether incomplete PDCP PDU data is able to be decrypted, based on a security algorithm, in a case that the security parameter needs to be updated; delete all received data, determine an RLC PDU corresponding to the deleted data or a PDU segment in the deleted data as a packet loss, record a NACK in the status record, and delete data in an RLC cache, when the incomplete PDCP PDU data is unable to be decrypted; and send partially-received data to the PDCP layer for decryption when the incomplete PDCP PDU data is able to be decrypted, and when the decryption is successful, determine that an RLC PDU corresponding to the successfully-decrypted data or a PDU segment in the successfully-decrypted data is correctly received, record an ACK in the status update and delete data in the RLC cache.

Seventh Embodiment

Figure 8:
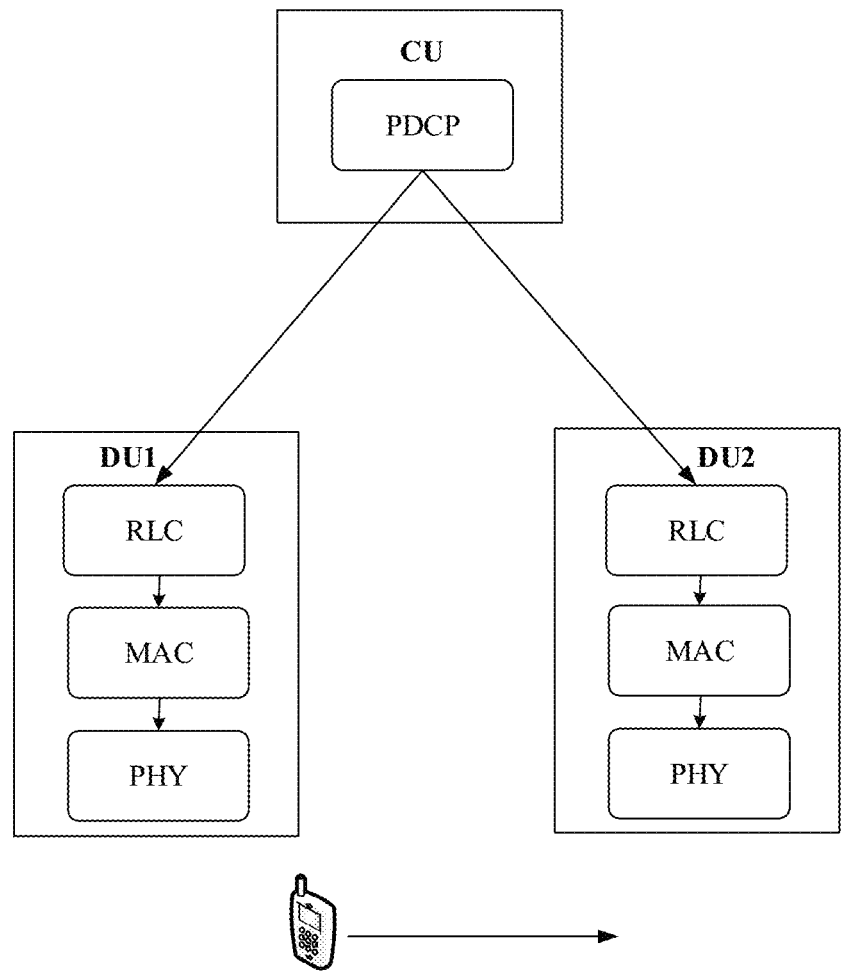
FIG. 8 is a schematic diagram showing an architecture of a mobile communication system according to a seventh embodiment of the present disclosure.
Figure 9:
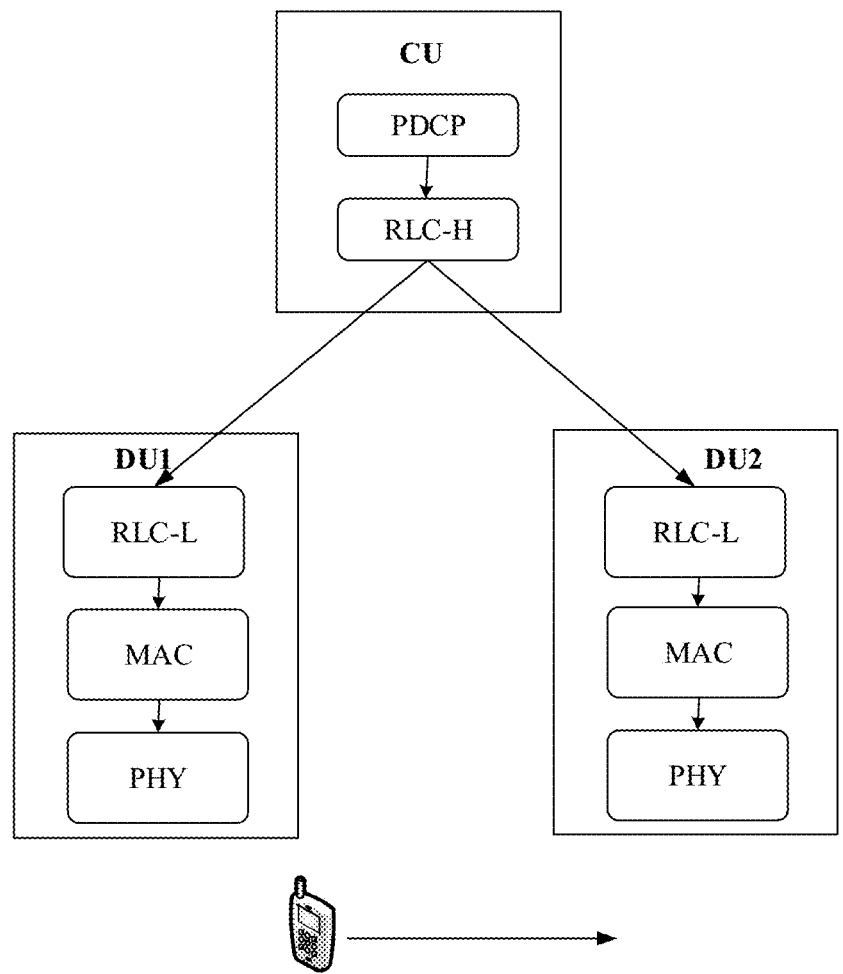
FIG. 9 is a schematic diagram showing an architecture of a mobile communication system according to an eighth embodiment of the present disclosure.

As shown in FIG. 8, a CU-DU architecture is adopted in the embodiment. In the CU-DU architecture, a master node is a Central Unit (CU) node, and a secondary node is a Distributed Unit (DU). A protocol stack separation mode between the CU and DU in this embodiment is a PDCP-RLC separation architecture. That is, the PDCP serves as a centralized protocol stack and is located in a CU entity, and protocol stacks at and below the RLC layer are located in individual DUs.

In this embodiment, when the UE hands over from one DU entity (DU1) connection to another DU entity (DU2) connection, a general process includes step a and step b.

In step a, the CU entity decides to hand over a UE operating under DU1 from DU1 to DU 2, due to mobility of the UE, based on a measurement report reported by the UE, a measurement result of a network side or other factors, for example, a load balance required between DUs.

In step b, the CU sends an indication message to DU1, requesting DU1 to forward the RLC statuses and cached data of all bears of the UE to DU2, i.e., a target node. The indication message may be a handover message or a reconfiguration message.

Acknowledged mode (AM) status information that the RLC needs to forward includes:

for an AM sending end, the AM status information includes: a sequence number (SN) of a next to-be-sent data packet, and an SN of a next acknowledged successfully-sent data packet. Optionally, the status information may further carry information related to a Poll. For example, e.g., triggering the Poll every other certain quantity of SNs or every other certain quantity of bytes, the accumulative total quantity of SNs or the accumulative total quantity of bytes from the last Poll triggering to a current time instant, and a maximum SN number recorded during the last Poll triggering; and for an AM receiving end, the AM status information includes: a maximum value of SNs of data packets correctly and completely received in sequence or the maximum value plus one, a maximum value of SNs of within-receiving-window data packets as received or the maximum value plus one, and a maximum value of SNs capable of being included in the status report or the maximum value plus one.

Alternatively, the AM status information has another carrying mode.

For an AM sending end, the AM status information carries an SN of a first data packet that has been sent with no ARQ ACK acknowledgement being received from a peer end, and carries a bit stream for indicating whether the SN of each data packet sent after this SN receives an ACK acknowledgement. For example, if the ACK is received, a corresponding bit is set to 1, otherwise, the bit is set to 0, until SNs of all data packets that have been sent are indicated. In a case that a segment is acknowledged, information of the segment can be carried. For example, the SN of the current first data packet that has been sent and is unacknowledged is 100. It means that feedback ACKs have been correctly received for all data packets before 100. Data packets 100 to 105 have been sent, but acknowledgement situations thereof are complex. Starting from data packet 100, the first data packet is not acknowledged, and statuses of the five data packets after the first data packet are 11001 respectively. In this case, SN=100 and a bit stream 11001 are carried, indicating acknowledgement situations of the data packets 101 to 105.

For an AM receiving end, the AM status information carries an SN of a first unreceived data packet and carries a bit stream for indicating a receiving situation of each data packet after the first unreceived data packet. For example, if the data packet is correctly received, a corresponding bit is set to 1, otherwise, the bit is set to 0, until SNs of all data packets that have been received are indicated. In a case that a segment is received, information of the segment can be carried.

Further, the cached data to be forwarded by RLC in the AM mode includes:

for an AM sending end, the cached data includes all data packets that have been sent, optionally carries the quantity of times that data having been sent is sent, and further includes all data that is not sent and is cached in a sending cache; and for an AM receiving end, all data in a receiving cache is forwarded to a target node. Even if the data is only a segment, information of the segment can also be carried and transferred to the target node. The segment information may be in a form of SO+LI. SO indicates a starting position of the segment in an original data packet, and LI indicates length information of the segment. Further, the segment information may further include information indicating whether the segment is a last segment, to facilitate data reorganization of the target node.

Unacknowledged mode (UM) status information that the RLC needs to forward is as follows.

For a UM sending end, the UM status information includes an SN of a data packet to be sent next.

For a UM receiving end, the UM status information includes a maximum value of SNs of received data packets or the maximum value minus one. Optionally, the UM status information may carry a status variable related to a reordering, such as a lower boundary of the reordering, an SN triggering the reordering, etc.

UM cached data that the RLC needs to forward is as follows.

For an UM sending end, all unsent data packets need to be forwarded to a target node. Optionally, data packets that have been sent with no HARQ ACK being received are also forwarded to the target node.

For an UM receiving end, optionally, data that has not been detected by a reordering timer may be forwarded to the target node.

It should be noted that, during the data forwarding in the AM and UM, once the data has been allocated with the SN of the RLC, the SN information has to be carried during data forwarding. If the data has not yet been allocated with the SN of the RLC, the data is forwarded in the same order as the data is received, without having to carry the SN information. The order of data forwarding is ensured with a sequence number of transmission layer such as GPRS Tunneling Protocol of User Layer (GTP-U), in the order that the data is received from a core network.

When a handover command sent by the CU is received by the source node DU1, optionally, the source node DU1 may trigger a new status report immediately formed in response to a current receiving status of the source node DU1 itself, and send the new status report to the user equipment UE.

The status report includes a maximum value of SNs of data packets that have been correctly received in the uplink, that is, ACK_SN. The same status report further includes SNs or segmentation information of all the data packets within the ACK_SN that have not been successfully received, that is, a list of NACK_SNs or segments. All the data packets that have not been successfully received include those that have been detected by a reordering timer, and those that have not been detected by the reordering timer. In this case, all gaps in a receiving sequence are determined as packet losses, and are carried in the list of NACK_SNs or segments.

The status information and the cached data are forwarded from the source node DU1 to the target node DU2, via a direct interface when the direct interface exists between the two nodes, or, via the node CU when no direct interface exists between the two nodes.

When the status information and the cached data sent by the DU1 are received by the target node DU2, the target node DU2 stores all status variables and information based on the status information and the data. If the receiving or acknowledgement situation of each data packet is described in detail in the status information, the status is updated based on the information. If only several key status variables are given, the situation of each data packet is determined based on the forwarded data. For example, once a data packet is carried in the forwarded data, it is determined that the data packet is not acknowledged and needs to be retransmitted. Or, for the receiving end, the forwarded data represents that data packets are out of order or are not successfully reorganized at the receiving end, and need to wait for other retransmissions.

For the UE side, if the indication message of handing over from DU1 to DU2 sent from the network side is received, in which processing information for L2 may be carried, for example, whether a PDCP is re-established, and whether an RLC is reset, then the UE performs processing in response to instructions in the indication message.

In the architecture shown in FIG. 8, since a PDCP entity on the network side is not changed at all, a PDCP entity on the UE side is reserved instead of being subject to any special operations.

For the RLC, in this case, the network side forwards the status and data of an RLC entity. Hence, an RLC entity on the UE side can also be reserved. What is special is that when any reordering timer of the UE starts at this point, the reordering timer needs to be stopped and reset immediately, and all current receiving gaps are determined as packet losses. Optionally, it may be determined whether to immediately feed a status report back to the network side, based on a configuration. The status report carries a maximum value of SNs of received data packets and SNs of all the gaps or list information of segments.

Eighth Embodiment

In the embodiment, a processing mode of another CU-DU architecture is given. A protocol stack separation mode between the CU and the DU is a Higher RLC-Lower RLC separation architecture. That is, the PDCP and Higher RLC (RLC-H) serve as centralized protocol stacks and are located in a CU entity, and protocol stacks at and below the Lower RLC layer are located in individual DUs. The Higher RLC completes a one-to-one mapping between RLC PDUs and PDCP PDUs, and allocates SNs of the RLC. The Lower RLC (RLC-L) sequentially sends RLC PDUs and RLC PDU segments with appropriate sizes to an MAC layer for packetization and transmission, based on sizes of transmission resources provided by the MAC layer in real-time.

In this architecture, the content of a data packet transmitted via the CU-DU interface is an RLC PDU carrying the SN of the RLC. This interface may also have a transport layer protocol, such as GTP-U or GRE.

In the embodiment of the present disclosure, the interaction mode of the CU-DU is similar to the master control node-secondary node mode in the seventh embodiment. Part of the functions of the RLC entity are processed in the CU in a centralized manner, such as SN allocation, and maintenance of status variables and the main timers. In addition, functions related to processing and organizing Automatic Retransmission Request (ARQ) are also performed in the RLC-Higher entity of the CU. When the UE hands over from one DU (i.e., a source DU) under the CU to another DU (i.e., a target DU), since the CU node is not changed, both the status variables and context information related to the RLC-H can be reserved.

For the RLC-Lower entity located in the DU, a sending end is mainly configured to cache certain transmission data, and organize RLC PDUs based on the size of a resource scheduled by the MAC layer in real time, so as to obtain data adapted to a transmission resource block and send the data to the MAC layer. A receiving end is mainly configured to receive a data packet and transmit the data packet to a higher layer. Optionally, RLC PDU segments may be reorganized and RLC PDUs may be ordered. When the UE hands over between DUs, an RLC-L entity of the DU, a MAC entity and a PHY entity below the RLC-L entity have two options: resetting and status forwarding. That is, the source DU transmits a related context status to the target DU. In the solution according to the embodiment, a few amount of status information related to a real-time transmission is stored in protocol stacks of the DU including RLC-L, and status information, retransmission information related to the RLC, and the like are all maintained in the RLC-H of the CU. Therefore, resetting all entities of the DU is a preferred choice.

Correspondingly, processing at the UE side includes: after receiving an indication message from the network side, which indicates the UE to hand over from the source DU to the target DU, the UE needs to process its current status in the following way:

resetting all protocol stack entities at a MAC layer and below the MAC layer.

directly determining a receiving Gap of data on which the RLC is performing a reordering detection as a packet loss instead of waiting, resetting a reordering timer and updating a variable of a relevant reordering record, determining all Gaps in a current receiving queue as packet losses, and updating a maximum value of SNs included in the status report to be a maximum value of SNs of the currently-received data packets or to be a next value; and triggering a status report reporting by the UE immediately, taking a maximum value of SNs of the currently-received data packets as ACK_SN, and carrying a list of SNs of all the data packets determined as lost packets in the same status report, which may include segment information; that is, when a segment of an RLC PDU is correctly received while other portions are lost, SO information and LI information of the lost portions are carried. Finally, a list of NACK_SNs and segments is formed and sent to the sending end to request necessary retransmission.

The UE maintains all statuses of the PDCP and continues processing.

Processing at the network side is as follows.

A new DU (i.e., the target DU) will construct new protocol stack entities at and below RLC_L. Each of the entities starts with an initialization status, and waits for data transmission and reception.

For the CU entity, all protocols and context statuses of the PDCP and the RLC_H are reserved. If there is a reordering timer for the RLC_H, the reordering timer is reset, and a variable of a relevant reordering record is updated. All Gaps in a current receiving queue are determined as packet losses. A maximum value of SNs included in the status report is updated to be a maximum value of SNs of the currently-received data packets or to be a next value. The CU immediately a status report reporting, takes a maximum value of SNs of the currently-received data packets as ACK_SN, and carries a list of SNs of all the data packets determined as lost packets in the same status report, which may include segment information; that is, when a segment of an RLC PDU is correctly received while other portions are lost, SO information and LI information of the lost portions are carried. Finally, a list of NACK_SNs and segments is formed and sent to the sending end to request necessary retransmission.

The PDCP layer of the CU may keep the current status without being subject to additional operations.

Ninth Embodiment

A handover scenario between eNB nodes is described according to the embodiment. In this embodiment, a UE needs to reserve context information of the RLC layer and layers above the RLC layer to reserve a current transmission status, when handing over from a source eNB to a target eNB.

Specifically, for the network side, in a case that the source eNB at the network side sends a handover preparation command to the target eNB, the handover preparation command needs to carry information to ask whether the target eNB supports and agrees to hold a layer 2 status. If a handover feedback signaling from the target eNB indicates that the target eNB agrees to hold the layer 2 status, then the layer 2 status is held. Otherwise, a current handover process is performed, that is, a status forwarding is only performed on the PDCP entity and the remaining protocol layers are all reset.

In a case that the source node (i.e., the source eNB) and the target node (i.e., the target NB) negotiate and determine to hold the layer 2 status, when forwarding the status to the target node, the source node needs to distinguish which statuses are those of the PDCP layer, and which statues are those of the RLC layer. Further, during data forwarding, the source node also needs to distinguish types of data, for example, which data belongs to the PDCP layer and which data belongs to the RLC layer.

When the UE hands over between the source node and the target node, if a security parameter can be maintained, it means that the status and data of the RLC layer can be forwarded to the target node in a completely unchanged manner, and an unfinished transmission is continued at the target node. If the security parameter cannot be maintained, it means that some statuses of the RLC layer may need to be updated. For example, if the received RLC PDUs cannot be reorganized into a complete PDCP PDU, whether the PDCP PDU segments can be successfully decrypted needs to be checked based on a security algorithm. If the PDCP PDU segments can be successfully decrypted, the transmission can be regarded as an effective transmission and no retransmission is required at the target node side. Only the unsuccessful portions need to be retransmitted. If the security algorithm determines that a decryption security operation can be successfully performed only when the entire PDCP PDU is successfully received, the successfully-received PDCP PDU segment also does not need to be forwarded and the entire PDCP PDU is considered lost. In this case, an SN of the RLC corresponding to the relevant PDCP PDU is also recorded as a packet loss, and relevant RLC PDUs and RLC PDU segments that have been successfully received are deleted.

What the network side needs to do is to forward status and data of the RLC that need to be forwarded, from the source node to the target node, and inform the UE in the handover command of whether the current RLC status is reset.

In a case that a security context can be reserved before and after the handover, the source node forwards both the information and data of the RLC to the target node, and for the content of the forwarding, please refer to the seventh embodiment. In a case that the security context needs to be updated before and after the handover, and the security algorithm does not support decryption of partial data, all the received PDCP PDU segments are deleted now, and the entire PDCP PDU is considered as lost in the RLC layer. The status of the RLC is re-updated based on these conditions and cached data related to these PDCP PDU segments is deleted. The new status of the RLC and the remaining data are forwarded to the target node. In a case that the security context needs to be updated before and after the handover, if the security algorithm supports decryption of partial data, all the received PDCP PDU segments are now sent to the PDCP layer for decryption, to recover PDCP SDU segments which are then forwarded to the target node. For the RLC layer, the relevant statuses are considered as a successful segment reception and forwarded to the target node. In this case, data of the RLC layer does not need to be forwarded to the target node, since the data of the RLC layer is encrypted using a security parameter of the source cell, and cannot be processed in the target cell. However, in this case, it is equivalent to that a partial decryption is performed at the PDCP layer on all the partially-received segment data, and the decrypted data is recovered as PDCP SDU segments. Therefore, in the target cell, a PDCP SDU level reorganization needs to be performed in a manner similar to that for the SO+LI and a last segment.

Corresponding processing operations on the UE side are as follows.

If the UE receives an indication message from the network side and the indication message carries an indication of not resetting the RLC, the UE operates following the indication.

If the security parameter does not need to be updated, the PDCP and the RLC of the UE may be completely reserved, and the MAC and layers below the MAC are reset. All receiving Gaps are considered as packet losses at the UE side, and a status report is fed back, similar to the UE behavior in the eighth embodiment.

If the security parameter needs to be updated, and the UE determine based on a security algorithm that the security algorithm cannot decrypt incomplete PDCP PDU data, all partially-received data is deleted, and RLC PDUs corresponding to the partially-received data, or PDU segments in the RLC PDUs are regarded as lost packets. A NACK is recorded in a status record, and data in the RLC cache needs to be deleted. Moreover, the receiving end sends an entire PDCP PDU to the PDCP for processing. The sending end needs the PDCP sending entity to perform re-encryption and related processing. In addition, MAC is reset and the status report is immediately fed back.

If the security parameter needs to be updated, and the UE determines based on a security algorithm that the security algorithm can decrypt incomplete PDCP PDU data, all partially-received data may be sent to the PDCP layer for decryption. If the decryption is successful, RLC PDUs corresponding to the partially-received data, or PDU segments in the RLC PDUs are regarded to be correctly received, an ACK is recorded in a status update, and data in the RLC cache needs to be deleted. The receiving end sends it to the PDCP for processing. The sending end needs the PDCP sending entity to perform re-encryption and related processing. In addition, the MAC is reset and the status report is immediately fed back.

Tenth Embodiment

In this embodiment, the two cells before and after the handover of the UE belong to one eNB. In general, according to the principle of security, a security parameter can be reserved in case of not replacing nodes. Similar to the case where the security context is continued in the ninth embodiment, processing at the UE side is similar to the case where the security parameter is not updated in the ninth embodiment.

For the network side, since the source cell and the target cell are located in the same eNB, forwarding between the cells can be achieved via the network side instead of requiring an interfacing process. Generally, it is possible that all statuses of the source cell are used in the target cell. It should be noted that, since a layer below the MAC is reset, all the receiving Gaps of the RLC are regarded as packet losses, a reordering timer is reset, and a status feedback is sent. These processes need to be performed.

For all the above embodiments, the foregoing processes are all described for one logical channel Generally, each of the logical channels is similarly processed and can be processed respectively. For example, no status holding and data forwarding may be required to be performed for a logical channel of signaling transmission, an RLC status forwarding may not be performed on the UM data, and an RLC status forwarding and holding may be optionally performed on the AM data.

It should be noted that the devices provided in the fourth, fifth, and sixth embodiments of the present disclosure are information processing devices capable of implementing the foregoing method embodiments, and therefore all the embodiments of the information processing methods provided by the foregoing method embodiments can be correspondingly applied to the fourth, fifth, and sixth embodiments, while also achieving the same or similar advantageous effects.

In the several embodiments provided by the present disclosure, it should be understood that the disclosed method and device may be implemented in other manners. For example, the device embodiments described above are merely illustrative. For example, the division of the units is only a division in terms of logical function. In actual implementation, there may also be other division manners; for example, multiple units or components may be combined or integrated into another system, or some features can be omitted or not executed. In addition, the mutual coupling or direct coupling or communication connection as shown or discussed may be an indirect coupling or communication connection through some interfaces, devices or units, and may be in electrical, mechanical or other forms.

In addition, individual functional units in various embodiments of the present disclosure may be integrated into one processing unit, or individual units may be physically included separately, or two or more units may be integrated into one unit. The above integrated unit can be implemented in the form of hardware or in the form of hardware plus software functional units.

The above described integrated unit implemented in the form of a software functional unit can be stored in a computer readable storage medium. The software functional unit is stored in a storage medium which includes a plurality of instructions for causing a computer device (which may be a personal computer, a server, or a network device, etc.) to execute all or part of the steps of the methods of the various embodiments of the present disclosure. The foregoing storage medium includes: a U disk, a mobile hard disk, a Read-Only Memory (ROM), a Random Access Memory (RAM), a magnetic disk or an optical disk, and various media that can store program codes thereon.

Described above are preferred embodiments of the present disclosure, and it should be noted that those skilled in the art can also make several improvements and modifications without departing from the principles of the present disclosure, which shall also fall within the scope of protection of the present disclosure.

What is claimed is:

1. A method for processing information applied to a first node, comprising:
   receiving, by the first node, an indication message from a network side, wherein the indication message indicates a user equipment under the first node to hand over to a second node; and
   negotiating, by the first node, with the second node to reserve radio link layer control protocol (RLC) status information and cached data of all bearers of the user equipment, so that the second node provides a continuing data service to the user equipment based on the reserved information,
   wherein the cached data comprises cached data to be forwarded in an acknowledged mode (AM) and from the first node to the second node;
   for an AM sending end, the cached data to be forwarded in the AM mode comprises: all data packets that have been sent with no ARQ ACK being received or all data packets after a first data packet that has been sent with no ARQ ACK being received, and all data packets that are not sent and are cached in a sending cache; and
   for an AM receiving end, the cached data to be forwarded in the AM mode comprises: all data packets in the receiving cache.

2. The method for processing information according to claim 1, wherein the first node is a first secondary node, the second node is a second secondary node, the first secondary node and the second secondary node share a same master control node, a Packet Data Convergence Protocol (PDCP) protocol stack is located at the master control node, and an RLC protocol stack and other protocol stacks below the RLC protocol stack are respectively located at the first secondary node and the second secondary node;
   the receiving, by the first node, an indication message from a network side comprises: receiving, by the first secondary node, an indication message sent by the master control node; and
   the negotiating, by the first node, with the second node to reserve RLC status information and cached data of all the bearers of the user equipment comprises: forwarding, by the first secondary node, the RLC status information and the cached data of all the bearers of the user equipment, to the second secondary node.

3. The method for processing information according to claim 2, wherein after the indication message sent by the master control node is received by the first secondary node, the method further comprises:
   immediately triggering and forming, by the first secondary node, a new status report in response to a current receiving status, and sending the new status report to the user equipment, wherein the status report comprises a maximum value (ACK_SN) of SNs of data packets that have been correctly received in the uplink, and the status report also comprises SNs or segmentation information of all the data packets within the ACK_SN that have not been successfully received.

4. The method for processing information according to claim 2, wherein in a case that a direct interface exists between the first secondary node and the second secondary node, the first secondary node forwards the RLC status information and the cached data of all the bearers of the user equipment to the second secondary node via the direct interface; and
   in a case that no direct interface exists between the first secondary node and the second secondary node, the first secondary node forwards the RLC status information and the cached data of all the bearers of the user equipment to the second secondary node via the master control node.

5. The method for processing information according to claim 2, wherein the RLC status information comprises acknowledged mode (AM) status information;
   for an AM sending end, the AM status information comprises one or more types of the following information: a sequence number (SN) of a next to-be-sent data packet, an SN of a next acknowledged successfully-sent data packet, and configuration information of a Poll, and the configuration information of the Poll comprises one or more types of the following information: triggering the Poll every other preset quantity of SNs or every other preset quantity of bytes, the accumulative total quantity of SNs or the accumulative total quantity of bytes from the last Poll triggering to a current time instant, and a maximum SN number recorded during the last Poll triggering, and
   for an AM receiving end, the AM status information comprises one or more types of the following information: a maximum value of SNs of data packets correctly and completely received in sequence or the maximum value plus one, a maximum value of SNs of within-receiving-window data packets as received or the maximum value plus one, and a maximum value of SNs capable of being included in the status report or the maximum value plus one; or
   for an AM sending end, the AM status information comprises: an SN of a first data packet that has been sent with no ARQ ACK acknowledgement being received from a peer end, and a corresponding bit stream, wherein the bit stream indicates whether each data packet sent after the first data packet receives an ARQ ACK acknowledgement, and
   for an AM receiving end, the AM status information comprises: an SN of a first unreceived data packet and a corresponding bit stream, wherein the bit stream indicates a receiving situation of each data packet after the first unreceived data packet.

6. The method for processing information according to claim 2, wherein the RLC status information comprises unacknowledged mode (UM) status information;
- for a UM sending end, the UM status information comprises an SN of a data packet to be sent next; and
- for a UM receiving end, the UM status information comprises a maximum value of SNs of received data packets or the maximum value minus one; or
- wherein the cached data comprises cached data to be forwarded in the UM mode;
- for a UM sending end, the cached data to be forwarded in the UM mode comprises: all unsent data packets, or, the cached data to be forwarded in the UM mode comprises: all unsent data packets, and data packets that have been sent with no HARQ ACK being received; and/or
- for a UM receiving end, the cached data to be forwarded in the UM mode comprises: a data packet that has not been detected by a reordering timer.

7. The method for processing information according to claim 1, wherein:
- for the AM sending end, the cached data to be forwarded in the AM mode further comprises the quantity of times that all data packets having been sent are sent; and
- for the AM receiving end, in a case that data in the receiving cache is a portion of a data packet, the cached data to be forwarded in the AM mode further comprises segmentation information of the portion of the data packet; and
- wherein the segmentation information is in a form of SO+LI, SO indicates a starting position of the portion in the data packet, and LI indicates length information of the portion; and
- the segmentation information also comprises information indicating whether the portion is a last segment of the data packet.

8. The method for processing information according to claim 1, wherein the first node is a first secondary node, the second node is a second secondary node, the first secondary node and the second secondary node share a same master control node, the PDCP protocol stack and an RLC_H protocol stack are located at the master control node, and an RLC_L protocol stack and other protocol stacks below a RLC_L layer are respectively located at the first secondary node and the second secondary node;
- the receiving, by the first node, an indication message from a network side comprises:
- receiving, by the first secondary node, an indication message sent by the master control node; and
- the negotiating, by the first node, with the second node to reserve RLC status information and cached data of all the bearers of the user equipment comprises:
- resetting, by the first secondary node, protocol stack entities at and below the RLC_L layer, or
- wherein the first node is a first evolved base station, the second node is a second evolved base station, and the negotiating, by the first node, with the second node to reserve RLC status information and cached data of all the bearers of the user equipment comprises:
- sending, by the first evolved base station, a handover preparation command to the second evolved base station, to ask whether the second evolved base station agrees to hold a layer 2 status; and
- performing, by the first evolved base station, an operation of holding the layer 2 status in a case that a handover feedback signaling from the second evolved base station indicates that the second evolved base station agrees to hold the layer 2 status, otherwise, performing a status forwarding on a PDCP protocol stack entity and resetting remaining protocol stack entities.

9. The method for processing information according to claim 8, wherein the performing, by the first evolved base station, an operation of holding the layer 2 status comprises:
- determining, by the first evolved base station, whether a security parameter is capable of maintaining unchanged;
- forwarding, by the first evolved base station, a status and data of an RLC layer to the second evolved base station, in a case that the security parameter is capable of maintaining unchanged;
- determining, by the first evolved base station, whether a received segment of a PDCP protocol data unit (PDU) is able to be successfully decrypted, based on a security algorithm, in a case that the security parameter needs to be updated;
- sending, by the first evolved base station, all received PDCP PDU segments to the PDCP layer for decryption to recover a PDCP service data unit (SDU) segment, and forwarding the recovered segment to the second evolved base station, in a case that the received segment is able to be successfully decrypted; and
- deleting, by the first evolved base station, the received segment of the PDCP PDU, recording at the RLC layer that the entire PDCP PDU is lost, updating the status of the RLC layer, deleting a cache associated with the segment of the PDCP PDU, and forwarding the updated status of the RLC layer and the remaining data to the second evolved base station, in a case that the received segment is unable to be successfully decrypted.

10. A method for processing information applied to a second node, comprising:
- negotiating, by the second node, with a first node to reserve radio link control protocol (RLC) status information and cached data of all bearers of a user equipment, wherein the user equipment is to handover from the first node to the second node; and
- providing, by the second node, the user equipment with a continuing data service based on the reserved information,
- wherein the cached data comprises cached data to be forwarded in an acknowledged mode (AM) and from the first node to the second node;
- for an AM sending end, the cached data to be forwarded in the AM mode comprises: all data packets that have been sent with no ARQ ACK being received or all data packets after a first data packet that has been sent with no ARQ ACK being received, and all data packets that are not sent and are cached in a sending cache; and
- for an AM receiving end, the cached data to be forwarded in the AM mode comprises: all data packets in the receiving cache.

11. The method for processing information according to claim 10, wherein the first node is a first secondary node, the second node is a second secondary node, the first secondary node and the second secondary node share a same master control node, a Packet Data Convergence Protocol (PDCP) protocol stack is located at the master control node, and an RLC protocol stack and other protocol stacks below the RLC protocol stack are respectively located at the first secondary node and the second secondary node, and
- the negotiating, by the second node, with the first node to reserve RLC status information and cached data of all bearers of a user equipment comprises:

receiving, by the second secondary node, the RLC status information and the cached data of all the bearers of the user equipment sent by the first secondary node; and storing, by the second secondary node, status variables and information of all the bearers of the user equipment based on the RLC status information and the cached data.

12. The method for processing information according to claim 10, wherein the first node is a first secondary node, the second node is a second secondary node, the first secondary node and the second secondary node share a same master control node, a PDCP protocol stack and an RLC_H protocol stack are located at the master control node, an RLC_L protocol stack and other protocol stacks below an RLC_L layer are respectively located at the first secondary node and the second secondary node, and the negotiating, by the second node, with the first node to reserve RLC status information and cached data of all bearers of a user equipment comprises:

reconstructing, by the second secondary node, an RLC_L protocol stack entity and protocol stack entities below the RLC_L layer, and initializing each of the constructed protocol stack entities.

13. The method for processing information according to claim 10, wherein the first node is a first evolved base station, the second node is a second evolved base station, and the negotiating, by the second node, with the first node to reserve RLC status information and cached data of all bearers of the user equipment comprises:

receiving, by the second evolved base station, a handover preparation command sent by the first evolved base station, wherein the handover preparation command asks whether to agree to hold a layer 2 status; and feeding, by the second evolved base station, a handover feedback signaling back to the first evolved base station, to indicate whether to agree to hold the layer 2 status.

14. A device for processing information applied to a first node, comprising: a processor and a memory, wherein the processor is configured to execute programs stored in the memory to: perform following steps:

receiving an indication message from a network side, wherein the indication message indicates a user equipment under the first node to hand over to a second node; and negotiating with the second node to reserve radio link layer control protocol (RLC) status information and cached data of all bearers of the user equipment, so that the second node provides a continuing data service to the user equipment based on the reserved information, wherein the cached data comprises cached data to be forwarded in an acknowledged mode (AM) and from the first node to the second node;

for an AM sending end, the cached data to be forwarded in the AM mode comprises: all data packets that have been sent with no ARQ ACK being received or all data packets after a first data packet that has been sent with no ARQ ACK being received, and all data packets that are not sent and are cached in a sending cache; and for an AM receiving end, the cached data to be forwarded in the AM mode comprises: all data packets in the receiving cache.

15. The device according to claim 14, wherein the first node is a first secondary node, the second node is a second secondary node, the first secondary node and the second secondary node share a same master control node, a Packet Data Convergence Protocol (PDCP) protocol stack is located at the master control node, and an RLC protocol stack and other protocol stacks below the RLC protocol stack are respectively located at the first secondary node and the second secondary node;

the processer is further configured to: receive an indication message sent by the master control node; and forward the RLC status information and the cached data of all the bearers of the user equipment, to the second secondary node.

16. The device according to claim 15, wherein after the indication message sent by the master control node is received by the first secondary node, the processor is further configured to:

immediately trigger and form a new status report in response to a current receiving status, and send the new status report to the user equipment, wherein the status report comprises a maximum value (ACK_SN) of SNs of data packets that have been correctly received in the uplink, and the status report also comprises SNs or segmentation information of all the data packets within the ACK_SN that have not been successfully received.

17. The device according to claim 15, wherein in a case that a direct interface exists between the first secondary node and the second secondary node, the processor is configured to forward the RLC status information and the cached data of all the bearers of the user equipment to the second secondary node via the direct interface; and in a case that no direct interface exists between the first secondary node and the second secondary node, the processor is configured to forward the RLC status information and the cached data of all the bearers of the user equipment to the second secondary node via the master control node.

18. The device according to claim 15, wherein the RLC status information comprises AM status information;

for an AM sending end, the AM status information comprises one or more types of the following information: a sequence number (SN) of a next to-be-sent data packet, an SN of a next acknowledged successfully-sent data packet, and configuration information of a Poll, and the configuration information of the Poll comprises one or more types of the following information: triggering the Poll every other preset quantity of SNs or every other preset quantity of bytes, the accumulative total quantity of SNs or the accumulative total quantity of bytes from the last Poll triggering to a current time instant, and a maximum SN number recorded during the last Poll triggering, and for an AM receiving end, the AM status information comprises one or more types of the following information: a maximum value of SNs of data packets correctly and completely received in sequence or the maximum value plus one, a maximum value of SNs of within-receiving-window data packets as received or the maximum value plus one, and a maximum value of SNs capable of being included in the status report or the maximum value plus one; or for an AM sending end, the AM status information comprises: an SN of a first data packet that has been sent with no ARQ ACK acknowledgement being received from a peer end, and a corresponding bit stream, wherein the bit stream indicates whether each data packet sent after the first data packet receives an ARQ ACK acknowledgement, and for an AM receiving end, the AM status information comprises: an SN of a first unreceived data packet and a corresponding bit stream, wherein the bit stream indicates a receiving situation of each data packet after the first unreceived data packet.

19. The device according to claim 14, wherein for the AM sending end, the cached data to be forwarded in the AM mode further comprises the quantity of times that all data packets having been sent are sent; and for the AM receiving end, in a case that data in the receiving cache is a portion of a data packet, the cached data to be forwarded in the AM mode further comprises segmentation information of the portion of the data packet; and wherein the segmentation information is in a form of SO+LI, SO indicates a starting position of the portion in the data packet, and LI indicates length information of the portion; and the segmentation information also comprises information indicating whether the portion is a last segment of the data packet.

20. A device for processing information applied to a second node, comprising: a processor and a memory, wherein the processor is configured to execute programs stored in the memory to: perform steps of the method for processing information according to claim 10.

\* \* \* \* \*